(12) United States Patent
Stoltzfus

(10) Patent No.: US 11,278,153 B2
(45) Date of Patent: Mar. 22, 2022

(54) OUTDOOR FIRE PIT AND POST HOLDER

(71) Applicant: Breeo, LLC, Kinzers, PA (US)

(72) Inventor: Amos A. Stoltzfus, Gordonville, PA (US)

(73) Assignee: Breeo, LLC, Kinzers, PA (US)

( * ) Notice: Subject to any disclaimer, the term of this patent is extended or adjusted under 35 U.S.C. 154(b) by 0 days.

(21) Appl. No.: 17/327,468

(22) Filed: May 21, 2021

(65) Prior Publication Data

US 2021/0274970 A1 Sep. 9, 2021

Related U.S. Application Data

(63) Continuation of application No. 16/994,237, filed on Aug. 14, 2020.

(60) Provisional application No. 62/890,417, filed on Aug. 22, 2019, provisional application No. 62/985,114, filed on Mar. 4, 2020, provisional application No.
(Continued)

(51) Int. Cl.
| | |
|---|---|
| *F24C 15/08* | (2006.01) |
| *A47J 37/07* | (2006.01) |
| *A47J 33/00* | (2006.01) |
| *F24B 5/02* | (2006.01) |

(52) U.S. Cl.
CPC .......... *A47J 37/0704* (2013.01); *A47J 33/00* (2013.01); *A47J 37/0786* (2013.01); *F24B 5/026* (2013.01); *F24C 15/08* (2013.01); *A47J 2037/0795* (2013.01)

(58) Field of Classification Search
CPC .... A47J 37/0704; A47J 33/00; A47J 37/0786; A47J 2037/0795; F24B 5/026; F24C 15/08
See application file for complete search history.

(56) References Cited

U.S. PATENT DOCUMENTS

| | | |
|---|---|---|
| 1,996,349 A | 4/1935 | Ross |
| 2,210,720 A | 8/1940 | Johnson et al. |
| 2,419,379 A | 4/1947 | Tindell, Jr. |

(Continued)

FOREIGN PATENT DOCUMENTS

| | | |
|---|---|---|
| DE | 10236945 A1 | 3/2004 |
| WO | 2010029567 A2 | 3/2010 |

OTHER PUBLICATIONS

USPTO NonFinal Office Action dated Jun. 11, 2021 in U.S. Appl. No. 29/777,785, filed Apr. 8, 2021 to Stoltzfus.
(Continued)

*Primary Examiner* — Alfred Basichas
(74) *Attorney, Agent, or Firm* — Fred H. Zollinger, III

(57) ABSTRACT

A fire pit includes a main body having a double outer wall that defines an air inlet. An accessory support post is received by the main body within the double outer wall. A locking projection and locking flange cooperate to lock the vertical and rotational position of the support post with respect to the main body of the fire pit. A floating fire box is supported from above by a grilling flange that allows the fire box to move down when heated. The accessory post can be used with a post holder next to a camp fire. The post holder and accessory post use of the locking projection and locking flange to secure the accessory post with respect to the holder. A grill having an outer body member protects the user's finger from engaging sharp edges of an expanded metal grill.

31 Claims, 23 Drawing Sheets

Related U.S. Application Data

63/001,970, filed on Mar. 30, 2020, provisional application No. 62/888,202, filed on Aug. 16, 2019.

(56) References Cited

U.S. PATENT DOCUMENTS

| | | |
|---|---|---|
| 2,604,884 A | 7/1952 | Walker |
| D186,487 S | 10/1959 | Brooks |
| D191,186 S | 8/1961 | Maki |
| 3,220,400 A | 11/1965 | Yager |
| D204,348 S | 4/1966 | Shilling |
| 3,458,895 A | 8/1969 | Miller, II |
| 3,765,397 A | 10/1973 | Henderson |
| 3,868,943 A | 3/1975 | Hottenroth et al. |
| 3,982,522 A | 9/1976 | Hottenroth et al. |
| D263,918 S | 4/1982 | Boyd |
| D264,541 S | 5/1982 | Bruveris |
| 4,471,751 A | 9/1984 | Hottenroth et al. |
| 4,548,193 A | 10/1985 | Marogil |
| 4,667,651 A | 5/1987 | Groeneweg |
| 4,732,138 A | 3/1988 | Vos |
| 4,762,114 A | 8/1988 | Blankemeyer |
| 4,813,308 A | 3/1989 | Petrus |
| D315,846 S | 4/1991 | Hatzenbeller |
| 5,094,223 A | 3/1992 | Gonzalez |
| D327,602 S | 7/1992 | Walker |
| 5,133,266 A | 7/1992 | Cullen |
| D335,811 S | 5/1993 | Bengtson et al. |
| D342,184 S | 12/1993 | Sanchez |
| D344,207 S | 2/1994 | Bauman |
| D349,024 S | 7/1994 | Doffee |
| D369,939 S | 5/1996 | Gibbs |
| 5,596,980 A | 1/1997 | Whalen et al. |
| D382,765 S | 8/1997 | Kellermann |
| D390,935 S | 2/1998 | Bosje et al. |
| 5,797,386 A | 8/1998 | Orr |
| 5,842,463 A | 12/1998 | Hall |
| 5,862,742 A | 1/1999 | Bjerg |
| 5,873,356 A | 2/1999 | Vossler et al. |
| 6,070,571 A | 6/2000 | Bradbury |
| D440,638 S | 4/2001 | Lefroy-Brooks |
| 6,289,795 B1 | 9/2001 | McLemore et al. |
| 6,298,843 B1 | 10/2001 | Olsen et al. |
| 6,336,449 B1 | 1/2002 | Drisdelle et al. |
| 6,354,288 B1 | 3/2002 | McDonald |
| D457,029 S | 5/2002 | Wickizer |
| 6,386,192 B1 | 5/2002 | Weber |
| 6,398,843 B1 | 6/2002 | Tarrant et al. |
| 6,578,568 B1 | 6/2003 | Dufort et al. |
| 6,845,705 B1 | 1/2005 | Chen |
| 7,007,687 B2 | 3/2006 | Lewis |
| D563,144 S | 3/2008 | Melzer et al. |
| 7,383,836 B2 | 6/2008 | Klemming |
| D577,946 S | 10/2008 | Carroll |
| D582,197 S | 12/2008 | Parmelee |
| D592,443 S | 5/2009 | Fraser |
| D624,350 S | 9/2010 | Wu |
| 8,272,601 B2 | 9/2012 | Kocher |
| D679,791 S | 4/2013 | Lowsky |
| D690,405 S | 9/2013 | Lowsky |
| D701,721 S | 4/2014 | Jan |
| D715,611 S | 10/2014 | Stamm et al. |
| 8,893,703 B2 | 11/2014 | DeFoort et al. |
| 8,991,382 B1 | 3/2015 | Mau |
| D726,235 S | 4/2015 | Nauli |
| D734,975 S | 7/2015 | Troyer, Jr. |
| 9,215,950 B2 | 12/2015 | Walker |
| D774,172 S | 12/2016 | Zemel et al. |
| D780,897 S | 3/2017 | Weng |
| D790,677 S | 6/2017 | Horsfield |
| D792,567 S | 7/2017 | Zemel et al. |
| D796,655 S | 9/2017 | Horne, III |
| D801,495 S | 10/2017 | Horne, III |
| D812,957 S | 3/2018 | McGuinness |
| 10,130,212 B2 | 11/2018 | Lopez |
| 10,222,092 B1 | 3/2019 | Traeger |
| D845,455 S | 4/2019 | Horsfield |
| 10,473,334 B2 | 11/2019 | Crosen |
| 10,588,455 B2 | 3/2020 | Horne, III |
| D914,172 S | 3/2021 | Stoltzfus |
| D917,682 S | 4/2021 | Stoltzfus |
| D918,357 S | 5/2021 | Stoltzfus |
| D918,358 S | 5/2021 | Stoltzfus |
| D919,777 S | 5/2021 | Stoltzfus |
| 2002/0040644 A1 | 4/2002 | McLemore et al. |
| 2006/0236996 A1 | 10/2006 | Mosher, II et al. |
| 2007/0137634 A1 | 6/2007 | Traeger et al. |
| 2007/0272229 A1 | 11/2007 | Becker et al. |
| 2007/0289587 A1 | 12/2007 | Eckes |
| 2008/0105252 A1 | 5/2008 | Barbour et al. |
| 2010/0258106 A1 | 10/2010 | Simms, II |
| 2011/0073098 A1 | 3/2011 | Chang |
| 2012/0145139 A1 | 6/2012 | Deeds |
| 2012/0196232 A1 | 8/2012 | Miller |
| 2012/0312297 A1 | 12/2012 | Walker |
| 2014/0238378 A1* | 8/2014 | Scott .................. F24B 1/19 126/55 |
| 2015/0075514 A1 | 3/2015 | Kuenzinger |
| 2015/0136112 A1 | 5/2015 | Dyson |
| 2015/0285507 A1* | 10/2015 | Troyer, Jr. .......... F24B 1/1902 126/30 |
| 2015/0305561 A1 | 10/2015 | Andol |
| 2016/0029841 A1 | 2/2016 | Walker |
| 2016/0166109 A1 | 6/2016 | Banal et al. |
| 2017/0303741 A1 | 10/2017 | Horne, III |
| 2018/0184840 A1 | 7/2018 | Maga |
| 2019/0137107 A1 | 5/2019 | Crosen |
| 2020/0096199 A1 | 3/2020 | Harrington et al. |
| 2020/0370753 A1 | 11/2020 | Goin |
| 2021/0018180 A1 | 1/2021 | Jan et al. |
| 2021/0045578 A1 | 2/2021 | Stoltzfus |
| 2021/0048188 A1 | 2/2021 | Harrington et al. |

OTHER PUBLICATIONS

Jan. 19, 2011 Fire Pit w/ Kettle Winch publication, Beaver Creek Furniture.

Admitted prior art, printed from https://breeo.co Aug. 15, 2019; breeo Smokeless Fire Pits, LUXEVE.

Admitted prior art, Breeo, LLC, Double Flame 17" Grill & Post, downloaded on Sep. 4, 2019 from https://breeo.co/collections/double-flame/products/double-flame-17-grill-post.

Admitted prior art, Breeo, LLC, Double Flame 19" Smokeless Fire Pit, downloaded on Sep. 4, 2019 from https://oreeo.co/collections/double-flame/products/double-flame-19-fire-pit-stainless.

Admitted prior art, Breeo, LLC, Double Flame 24" Smokeless Fire Pit—Steel, downloaded on Sep. 4, 2019 from https://breeo.co/collections/double-flame/products/double-flame-24-fire-pit-steel.

Admitted prior art, Breeo, LLC, Double Flame 24" Smokeless Fire Pit—Stainless, downloaded on Sep. 4, 2019 from https://breeo.co/collections/double-flame/products/double-flame-24-fire-pit-stainless.

Admitted prior art, Breeo, LLC, Double Flame 24" Double Flame 24" Grill & Post, downloaded on Sep. 4, 2019 from https://breeo.co/collections/double-flame/products/double-flame-24-grill-post.

Breeo, LLC, Phoenix, downloaded on Sep. 4, 2019 from https://breeo.co/collections/phoenix.

Yardcraft, The Forge Smokeless Fire Pit, accessed Apr. 22, 2021, printed May 11, 2021, from www.yardcraft.com/product/fire-pits/urban-fire-collection/the-forge-smokeless-fire-pit/.

\* cited by examiner

OUTDOOR FIRE PIT AND POST HOLDER

CROSS REFERENCE TO RELATED APPLICATIONS

This application is a continuation of U.S. patent application Ser. No. 16/994,237 filed Aug. 14, 2020, which application claims the benefit of U.S. Provisional Patent Applications 62/888,202 filed Aug. 16, 2019, 62/890,417 filed Aug. 22, 2019, 62/985,114 filed Mar. 4, 2020, and 63/001,970 filed Mar. 30, 2020; the disclosures of each are incorporated herein by reference.

BACKGROUND OF THE DISCLOSURE

1. Technical Field

The disclosure generally relates to devices used to contain fires and cook over fires. More particularly, the disclosure relates to an outdoor fire containment device commonly known as a fire pit and to a holder for an accessory post that allows accessories such as grills and kettles to be used over a fire. Specifically, the disclosure relates to the air inlet configurations for the fire pit, the configuration of the grill support post, the configuration of the grill carried by the grill support post, a holder for the grill support post, and the configuration of the legs for the fire pit.

2. Background Information

People enjoy burning small camp fires in their backyards. These fires are used for general enjoyment and for cooking. One drawback with a backyard campfire—especially one made from a soft wood or a wood containing water—is the smoke generated from the fire. The smoke can infiltrate the owner's house and neighbors' houses. This problem has led some cities and communities to completely ban backyard campfires. Another issue is positioning a grill or container at the proper location above the flames for cooking a particular food. Some people use fire pits to control and contain their camp fires. In some communities, the use of a fire ring or fire pit is mandatory. A popular fire pit configuration has an airflow chamber between the exterior walls of the main body wherein air is heated before being introduced at the top of the burn box. This helps to reduce smoke produced by the fire. Although various versions of the reduced smoke fire pit are known, there remains room for improvement.

SUMMARY OF THE DISCLOSURE

The disclosure provides a fire pit device for containing a camp fire. The fire pit includes a main body having a double outer wall that defines an air inlet. An accessory support post is received by the main body within the double outer wall. A locking projection and locking flange cooperate to lock the vertical and rotational position of the support post with respect to the main body of the fire pit. The disclosure also provides a method for locking an accessory post to the body of a fire pit.

The disclosure provides a fire pit having a body having a bottom wall and a sidewall that define a fire box; the fire box adapted to receive fuel that will be burned when the fire pit is used; the sidewall defining an air supply duct for the fire box; the sidewall having an inner sidewall spaced inwardly from an outer sidewall with the air supply duct defined between the inner and outer sidewalls; an accessory post having an upper portion and a lower portion; the lower portion being selectively connected to the body; and a locking assembly having locked and unlocked conditions; in the locked condition, the locking assembly preventing the accessory post from rotating with respect to the body and preventing the accessory post from being removed from the body.

The disclosure provide a fire pit having a body having a bottom wall and a sidewall that define a fire box; the fire box adapted to receive fuel that will be burned when the fire pit is used; the sidewall defining an air supply duct for the fire box; the sidewall having an inner sidewall spaced inwardly from an outer sidewall with the air supply duct defined between the inner and outer sidewalls; and an accessory post having an upper portion and a lower portion; the lower portion being disposed between the inner and outer sidewalls; the upper portion disposed above the sidewall.

The disclosure provides a post holder and method for securing the accessory post in the ground next to another fire source. The device and method also include the use of the locking projection and locking flange to secure the accessory post with respect to the holder. The post holder and method allows the owner of the accessory post and grill to use these with other camp fires without the need to bring the entire fire pit device along.

The disclosure provides a method for supporting a cooking device such as a grill or kettle hanger above a fire site. The method includes the steps of embedding a holder into the ground next to the fire site; sliding a lower portion of an accessory post into the holder; and locking the accessory post to the holder against rotation and removal. The method also the step of repeatedly impacting the holder with an upper portion of the accessory post by sliding it within the holder tube. This method allows the device to be installed without the need to carry additional tools to embed the holder into the ground.

The disclosure also provides a fire pit device wherein air inlets are provided in the bottom of the main body where the fuel for the fire is supported and the ashes produced by the fire collect. The fire pit includes air inlet channels that define raised air inlets that limit clogging by the ash while evenly distributing the inlet air under the fire.

The disclosure further provides a main body having a double outer wall that defines an air inlet for the fire pit. The main body is supported above the ground by a plurality of legs. The legs extend up along the entire height of the double outer wall to abut the underside of an overhanging flange to stiffen the main body of the fire pit.

The disclosure further provides an interior fire box portion of the main body that is provided in a floating configuration suspended from the upper flange of the device. The floating configuration allows the interior fire box to move down when the device is in use causing the upper flange to tilt inwardly. This is beneficial when the upper surface of the flange is used as a grilling surface because cooking juices flow back into the firebox inside of onto the surface supporting the fire pit.

The disclosure further provides the configuration for a grill that can be carried by a post above a fire. The grill includes an outer body member that encloses the outer edge of the grill to provide safety, to increase the strength of the grill, and to provide a retention lip to the grill. In the exemplary configuration, the outer body member is circular in cross section and receives the outer edge of the expanded metal grill at its centerline.

The individual features may be combined in different combinations than specifically described below to form different configurations of the device of the disclosure. The preceding non-limiting aspects of the disclosure, as well as others, are more particularly described below. A more complete understanding of the devices, assemblies, and methods can be obtained by reference to the accompanying drawings, which are not intended to indicate relative size and dimensions of the assemblies. In those drawings and the description below, like numeric designations refer to components of like function. Specific terms used in that description are intended to refer only to the particular structure of the embodiments selected for illustration in the drawings, and are not intended to define or limit the scope of the disclosure.

DETAILED DESCRIPTION OF THE DISCLOSURE

Figure 1:
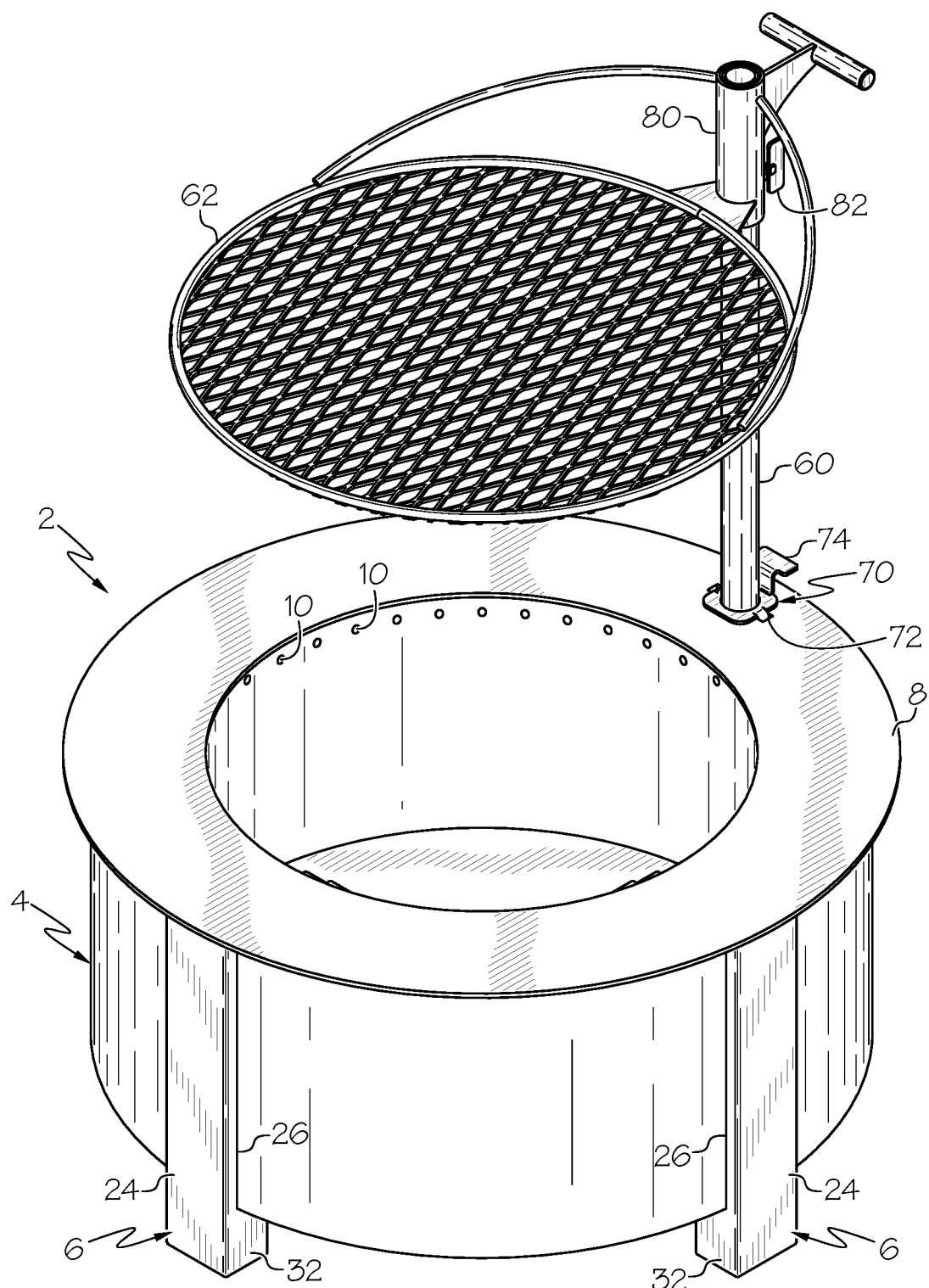
FIG. 1 is a perspective view of an exemplary configuration of the fire pit.
Figure 2:
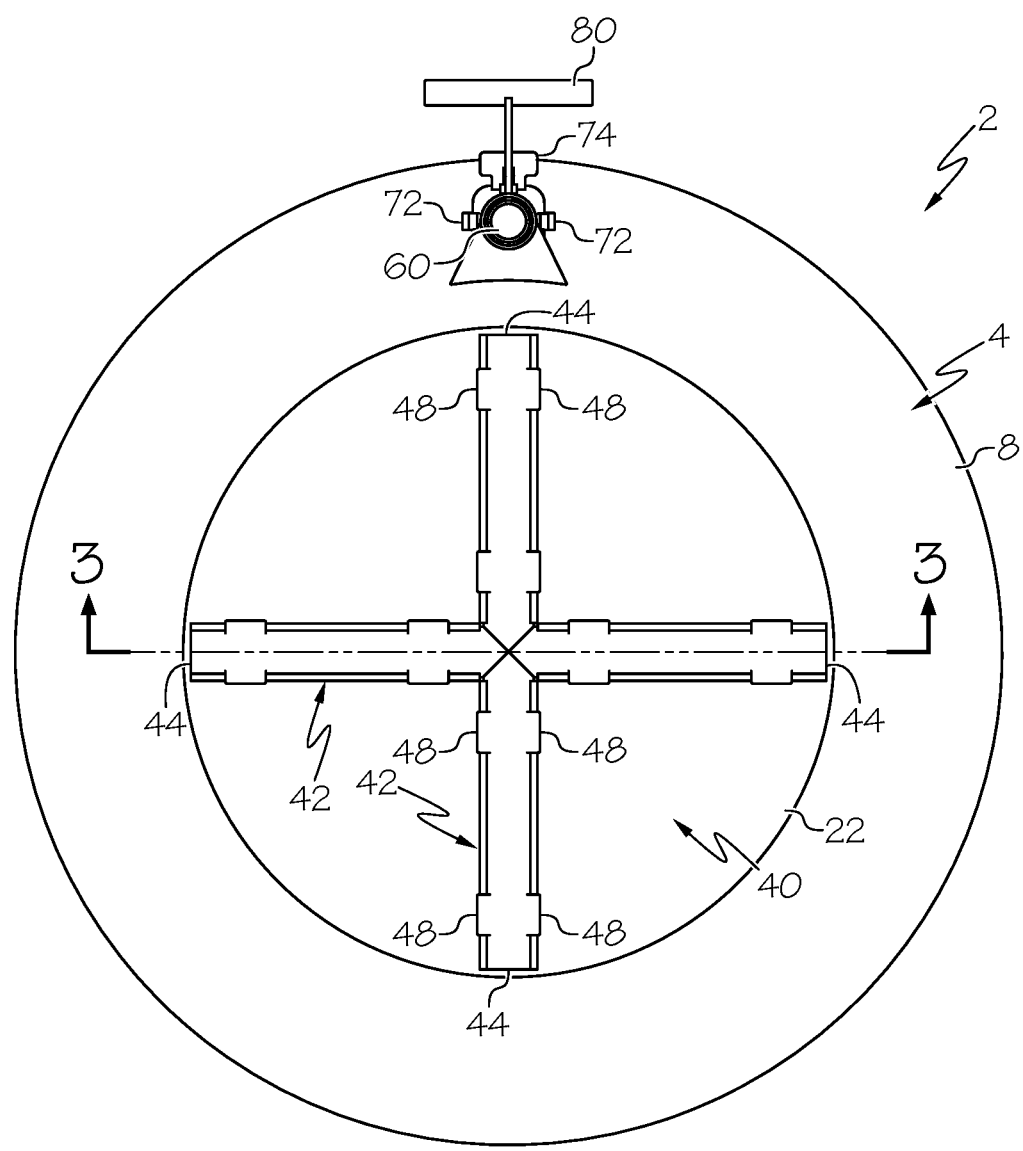
FIG. 2 is a top plan view of the fire pit of FIG. 1 with the grill removed.
Figure 3:
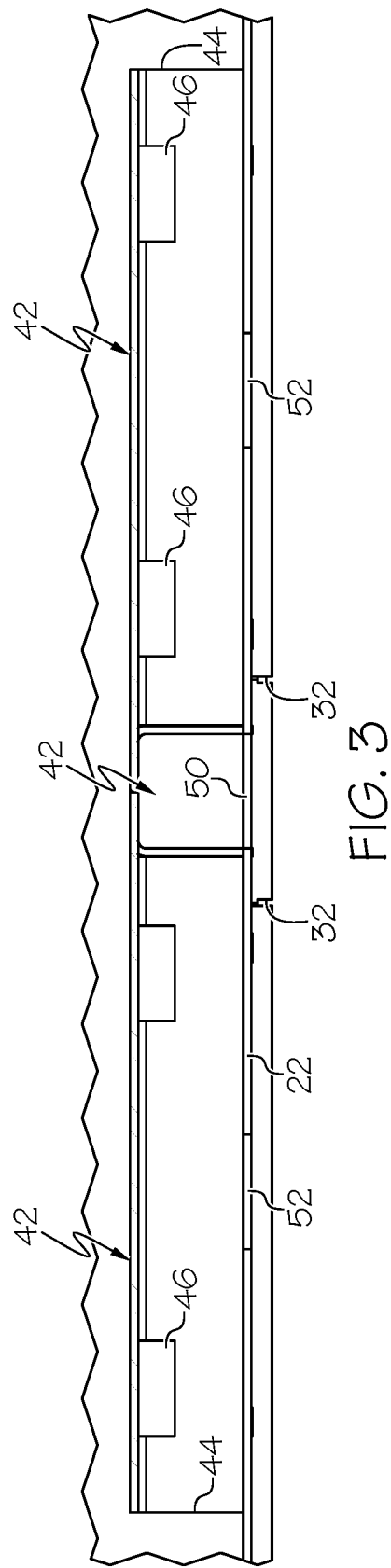
FIG. 3 is a section view taken along line 3-3 of FIG. 2.

An exemplary configuration of a fire pit device of the disclosure is indicated generally by the numeral 2 in the accompany drawings. Device 2 generally includes a main body 4 supported above the ground by a plurality of legs 6. An overhanging grilling flange 8 is disposed about the top of main body 4. Flange 8 may be used to support cooking tools, grills, or as a protective bumper. Flange 8 can be made from 304 stainless steel to also function as a grilling surface itself. Device 2 provides a safe and convenient place for one to burn a small fire that can be used for cooking or general enjoyment. The fire is burned in the fire box cavity defined by main body 4. Device 2 may be made from any of a variety of fire-resistant materials. Main body 4 can be fabricated from steel and protected with a heat-resistant paint.

Device 2 is configured to reduce the amount of smoke produced by the fire burning in main body 4. The reduction in smoke is achieved by supplying heated combustion air to the top of the fire. This air is supplied through a plurality of upper air supply openings 10 defined by main body 4 adjacent the upper end of main body 4. Openings 10 may extend about the entire circumference of body 4. Air is supplied to upper air supply openings 10 through an air supply duct 14 that extends from an inlet disposed adjacent the lower end of main body 4 to openings 10. In the exemplary configuration, duct 14 is defined by inner 16 and outer 18 concentric sidewalls of main body 4. In one configuration of device 2, air supply duct 14 is disposed about the entire circumference of main body 4 with only a plurality of supports 20 interrupting the air flow through duct 14. Supports 20 are aligned with legs 6 and extend from the bottom wall 22 of main body 4 out to outer concentric wall 18. Supports 20 maintain the spacing between walls 16 and 18 but allow inner sidewall 16 to move up and down with respect to outer sidewall 18. In another configuration, duct 14 may be divided into a plurality of adjacent or spaced ducts. Positioning air duct 14 along the sidewall of main body 4 allows the air flowing up through duct 14 to be heated before it exits duct 14 to aid the combustion.

Figure 10:
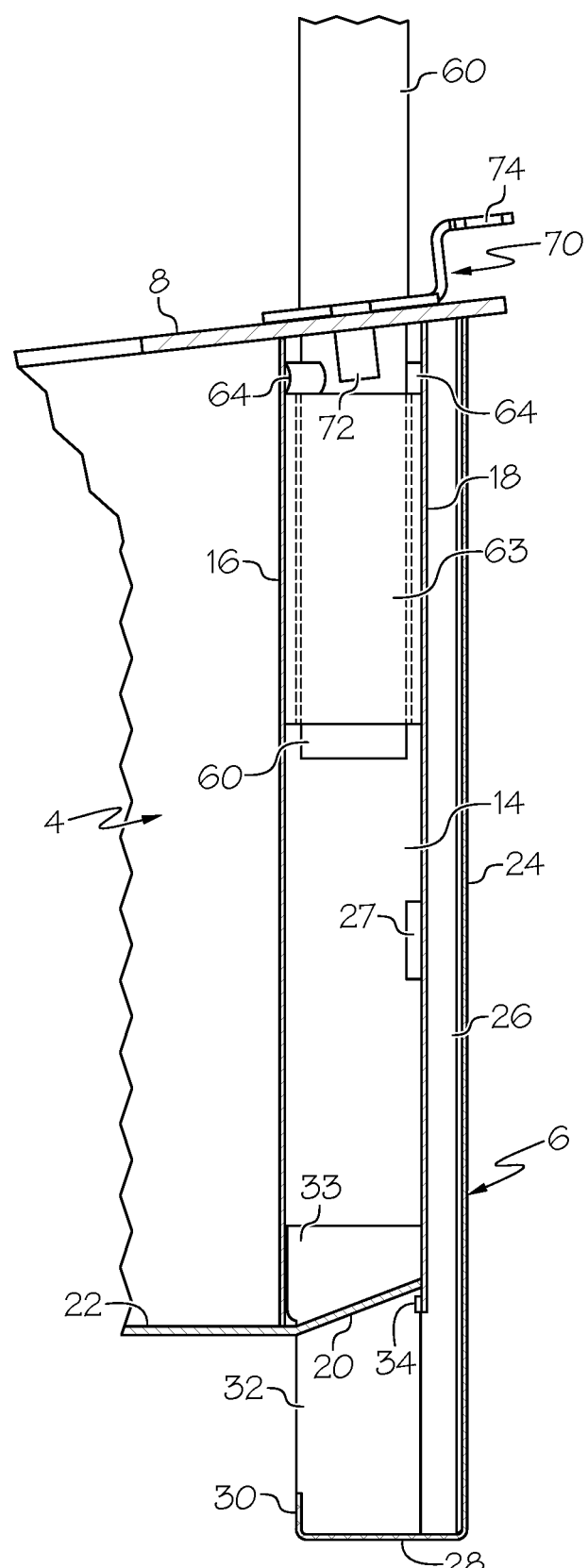
FIG. 10 is a section view similar to FIG. 7 showing the grilling flange tilted downwardly.

The lower ends of sidewalls 16 and 18 are spaced and not connected to define the inlet of duct 14. The upper ends of sidewalls 16 and 18 are joined together by flange 8 so that openings 10 define the outlet of duct 14. In another configuration, the lower ends of walls 16 and 18 are joined and a plurality of inlets are defined. When a fire is burning in main body 4, inner sidewall 16 is heated to draw air into the inlet where it is warmed. The warmed air rises within duct 14 and exits through openings 10 to the top of the fire. Flange 8 projects radially inwardly over the openings 10 to form a lip that helps to direct air from openings 10 toward the middle of the fire. The warmed air assists the combustion and thus reduces the amount of smoke produced by the fire. When cool, flange 8 can be tilted inwardly slightly such that its inner edge is lower than its outer edge. When device 2 is in use and the fire box is loaded with fuel and the elements of device are hot, the fire box defined by inner wall 16 and bottom wall 22 move downwardly causing flange 8 to tilt downwardly more as shown in FIG. 10. The weight of the fuel and the fire box provide a downwardly force. When cool, the inner edge of flange 8 is either the same height or only about ⅛ inch lower than the outer edge of flange 8 but when device 2 is in use and hot, the inner edge can move down to be ¾ inch lower than the outer edge of flange 8. This movement helps drain grilling juices inwardly instead of out over the outer sidewall 18 and onto the ground supporting device 2. One configuration has an inner flange opening of nineteen inches with an outer flange diameter of twenty-three and a half inches to provide a searing surface on flange 8 of 130 square inches. This configuration is fifteen inches tall. Another configuration has an inner flange opening of twenty-four inches with an outer flange diameter of twenty-nine and a half inches to provide a searing surface on flange 8 of 230 square inches. This configuration is also fifteen inches tall.

Main body 4 is provided in the form of a cylindrical cup with inner sidewall 16 forming a right angle with the bottom wall 22 of main body 4. The height of main body 4 is about half of the diameter with the lip formed by flange 8 extending inwardly about a half inch to three inches. In one configuration, the height of main body 4 is eight to eighteen inches with the diameter being eighteen inches to thirty-six inches. These dimensions have been found to provide desirable results with the air supplied through openings 10 being radially close enough to the center of the fire to reducing the amount of smoke produced by the fire.

Each leg 6 has a lower portion that extends lower than bottom wall 22 and an upper portion that extends along outer wall 18 to engage the underside of flange 8. Legs 6 position bottom wall 22 above the ground and stiffen main body 4. Legs 6 also maintain the centered position of the fire box by engaging inner sidewall 16 and allowing it to slide up and down along legs 6. Each leg 6 includes an outer leg wall 24 and leg sidewalls 26 which all extend from under flange 8 to the bottom end of leg 6. Leg sidewalls 26 can be welded to outer sidewall 18. As an alternative or in addition to welding, a plurality of tabs 27 project from each leg sidewall 26 through outer sidewall 18 where they can be bent to hold leg 6 in place, welded, or bent and welded. Tabs 27 can be press fit or snap fit through the openings defined to receive them. Each leg 6 also includes a foot wall 28 that projects radially inwardly from the lower end of outer leg wall 24. Foot wall 28 engages the ground upon which device 2 is disposed. An inner leg wall 30 projects upwardly from the inner end of foot wall 28. Inner leg wall 30 limits the collection of dirt, sand, or gravel on top of foot wall 28 and stiffens leg 6. Legs 6 can be formed from a single integral piece of material or from a plurality of pieces welded together.

Figure 7:
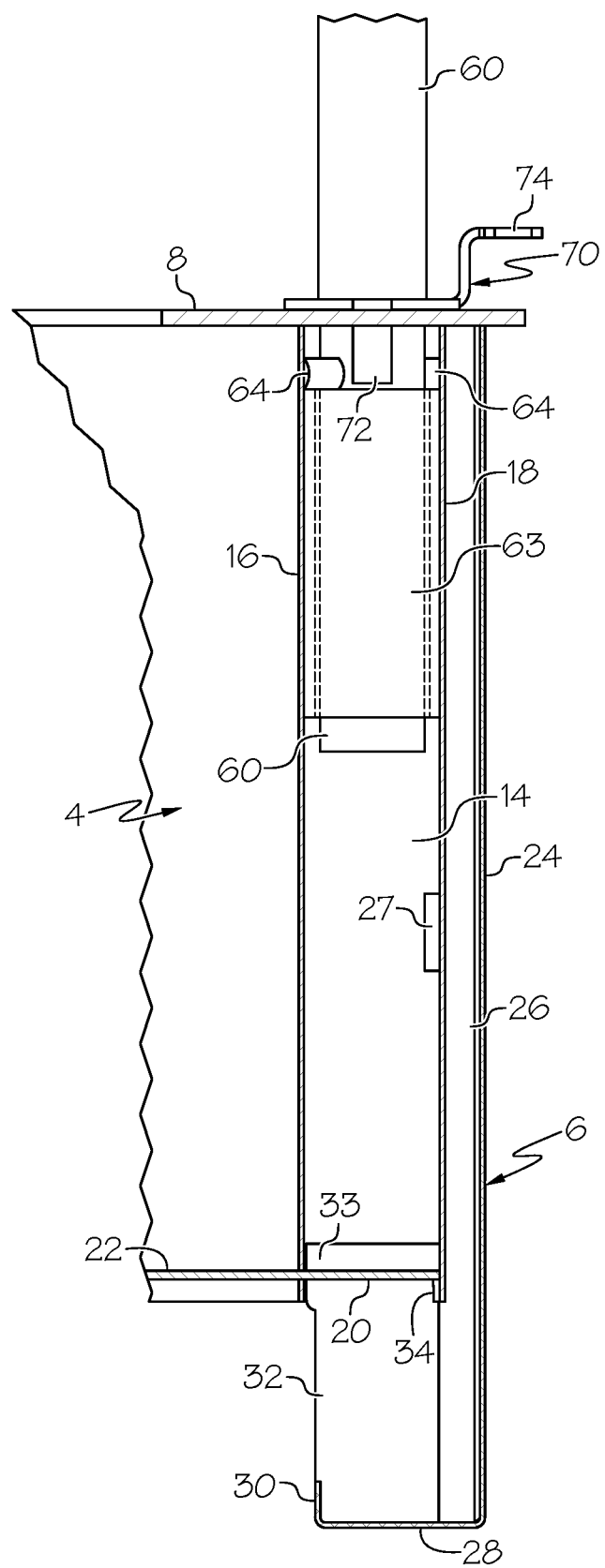
FIG. 7 is a section view taken along line 7-7 of FIG. 6.
Figure 8:
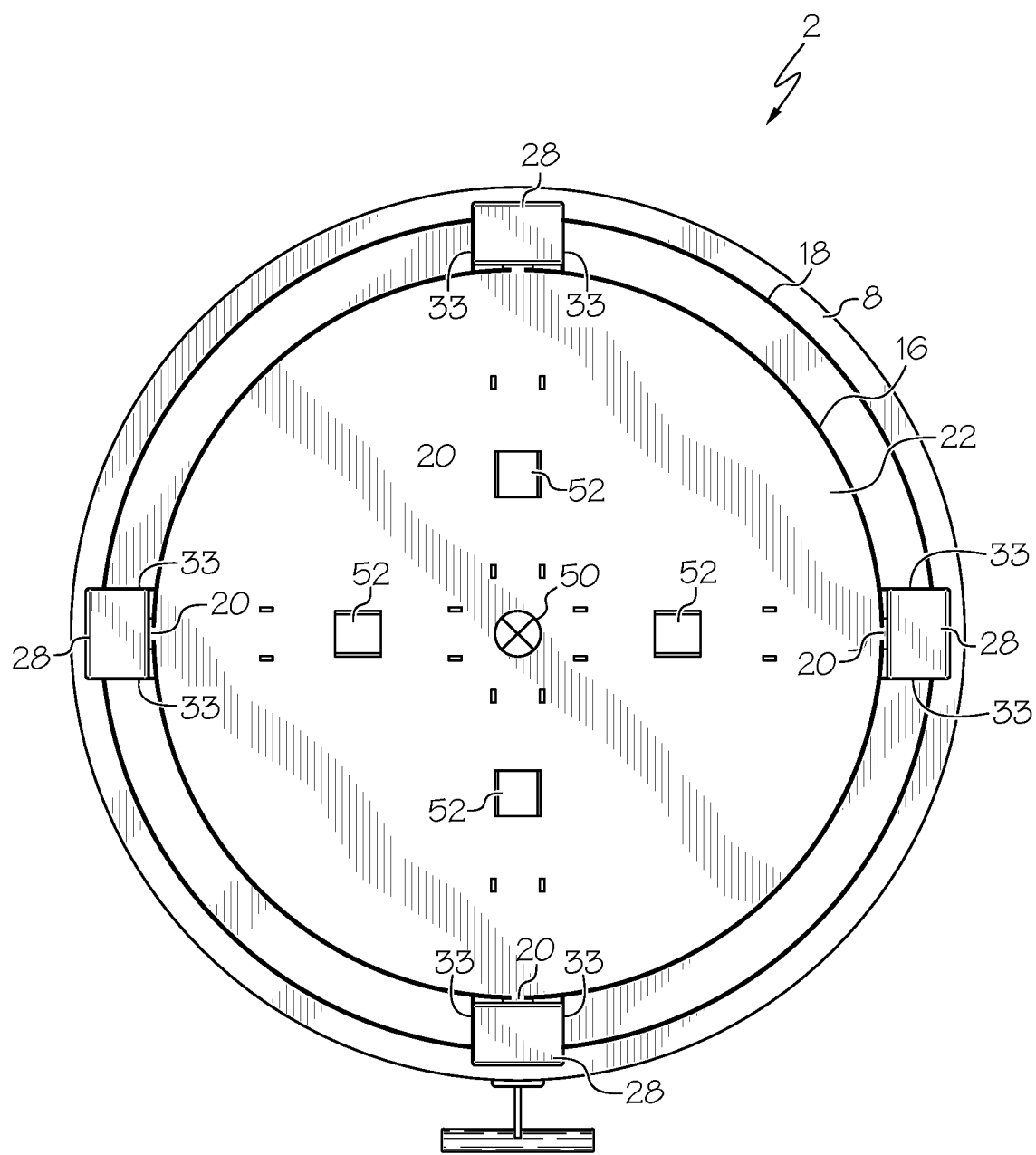
FIG. 8 is a bottom plan view of the fire pit of FIG. 1.
Figure 9:
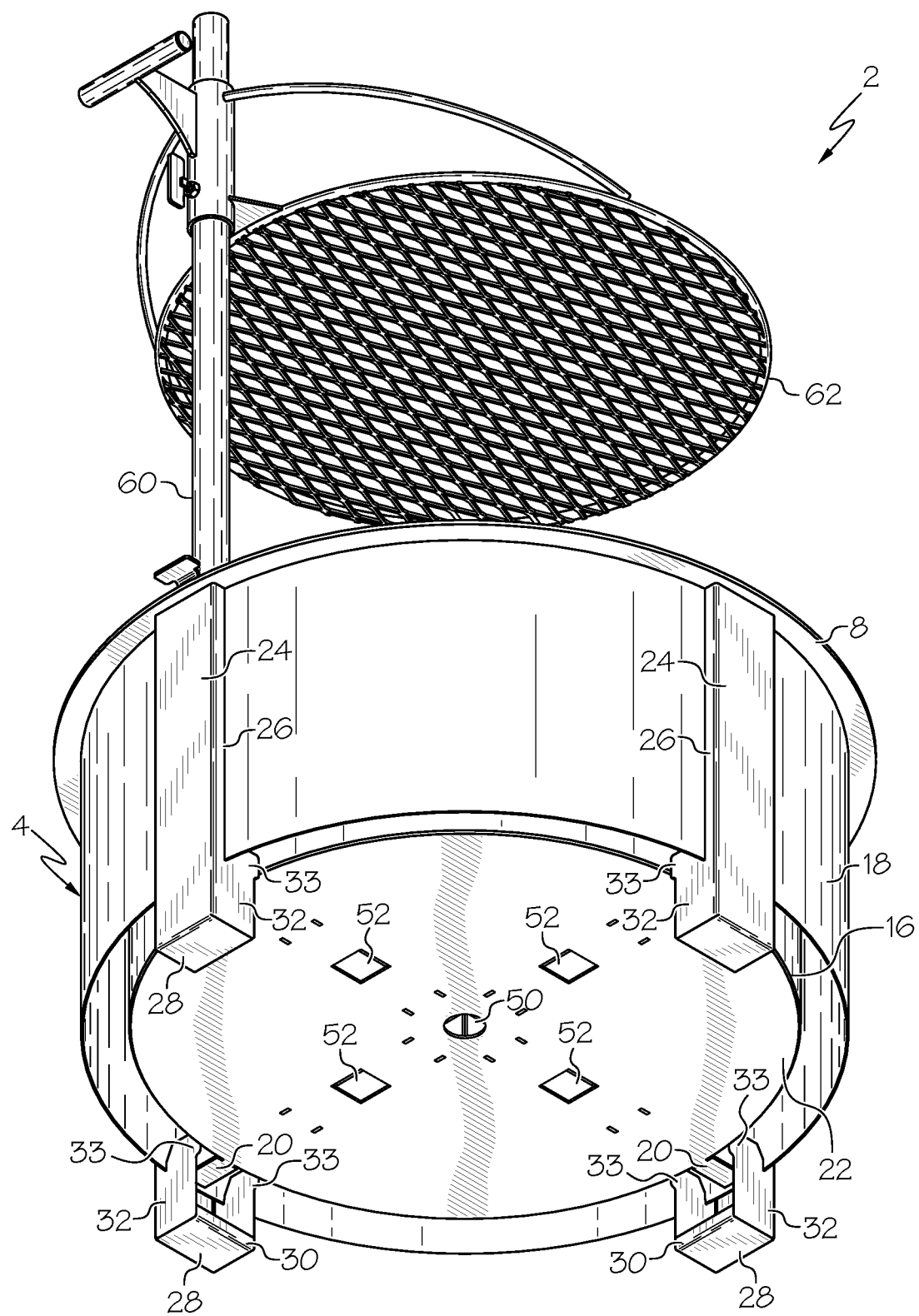
FIG. 9 is a bottom perspective view of the fire pit of FIG. 1.

The lower portion of each leg sidewall 26 is enlarged to at least match the leg depth defined by foot wall 28. These lower portions can be integrally formed with leg sidewalls 26 or can be formed by attaching additional lateral leg walls 32. A slot 34 is defined at the upper junction of each lateral leg wall 32 and each leg sidewall 26. The lower edge of outer sidewall 18 is received in slot 34 to further connect leg 6 to main body 4 and to stiffen device 2. In another configuration, lateral leg walls 32 define slots for each of outer sidewall 18 and inner sidewall 16. As shown in FIGS. 7-9, the inner edges 33 of lateral leg walls 32 engage inner sidewall 16 but do not support it from below such that inner sidewall 16 and bottom wall 22 can move downwardly when device 2 is in use.

An air inlet assembly 40 is carried by bottom wall 22 inside main body 4. Air inlet assembly 40 evenly distributes inlet air to the fire while limiting clogging from ash. Air inlet assembly 40 includes a plurality of open arms 42 that radially extend outwardly from a central joint. The outer end of each arm 42 is open to define first air inlets 44. These first air inlets 44 have the same width and height as the openings defined by open arms 42. These first air inlets 44 are substantially parallel (they directly face) the lower end of inner sidewall 16. First air inlets 44 are closer to inner sidewall 16 than the width of open arm 42. These first air inlets 44 thus distribute inlet air to the outer perimeter of the fire. Spaced second air inlets 46 are defined along the length of the top portion of each open arm 42. Second air inlets 46 are raised up above the upper surface of bottom wall 22 to limit clogging by ash formed by burning fuel. Each second air inlet 46 is formed by bending a portion of the sidewall of open arm 42 upwardly which provides an overhang 48 to limit the entrance of ash into open arms 42. The plurality of second air inlets 46 evenly distribute inlet air below the fire. Air openings 50 and 52 are defined by bottom wall 22 to deliver air from below device 2 into assembly 40. The air is pulled under and along the heated assembly 40 so that it is preheated before being used in the combustion.

An accessory post 60 can be selectively carried by and removed from main body 4. Accessory post 60 can be used to support a cooking grill 62 or a hook for a hanging pot or for supporting a pot and winch assembly. When using accessories such as grill 62, it is desired that accessory post 60 is locked in place and does not rotate with respect to main body 4. In this configuration, the bottom portion of accessory post is inserted through flange 8 and into a post support sleeve 63 secured to main body 4 inside air supply duct 14 at the location of one of legs 6. Sleeve 63 receives post 60 in a sliding relationship that allows post to slide in and out of sleeve 63, but limits lateral movement. The lower end of accessory post 60 is disposed inside sleeve 63, extends below sleeve 63, or extends all the way down and engages support 20 or a portion of leg 6. When locked in place, one or more locking projections 64 engage one or both of sidewalls 16 and 18 to lock the rotational position of post 60 with respect to main body 4. Locking projections 64 sit on top of sleeve 63. Locking projection 64 is also disposed under flange 8 so post 60 cannot be unintentionally lifted while in use.

Figure 4:
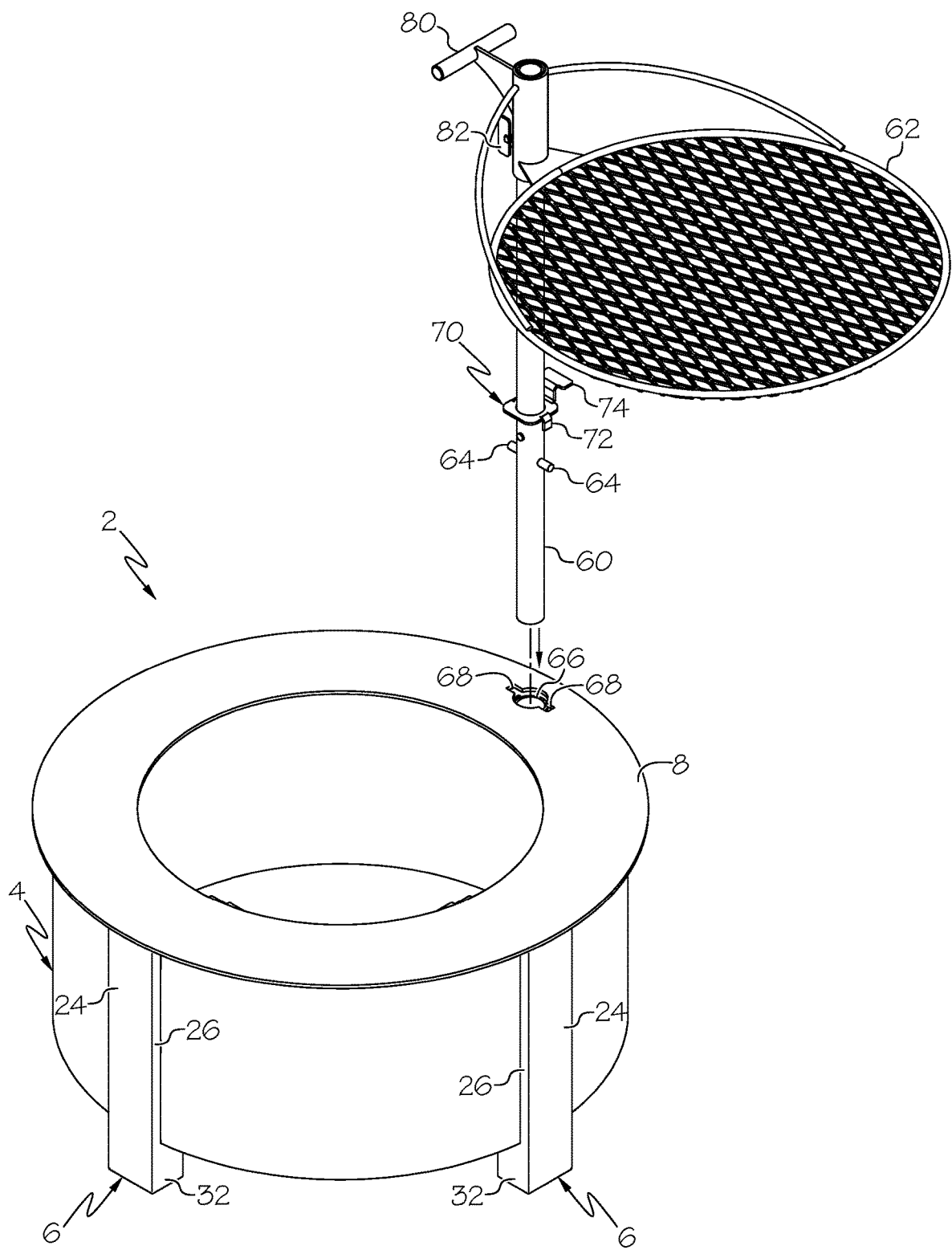
FIG. 4 is a view similar to FIG. 1 showing an initial step of installing the support post.
Figure 5:
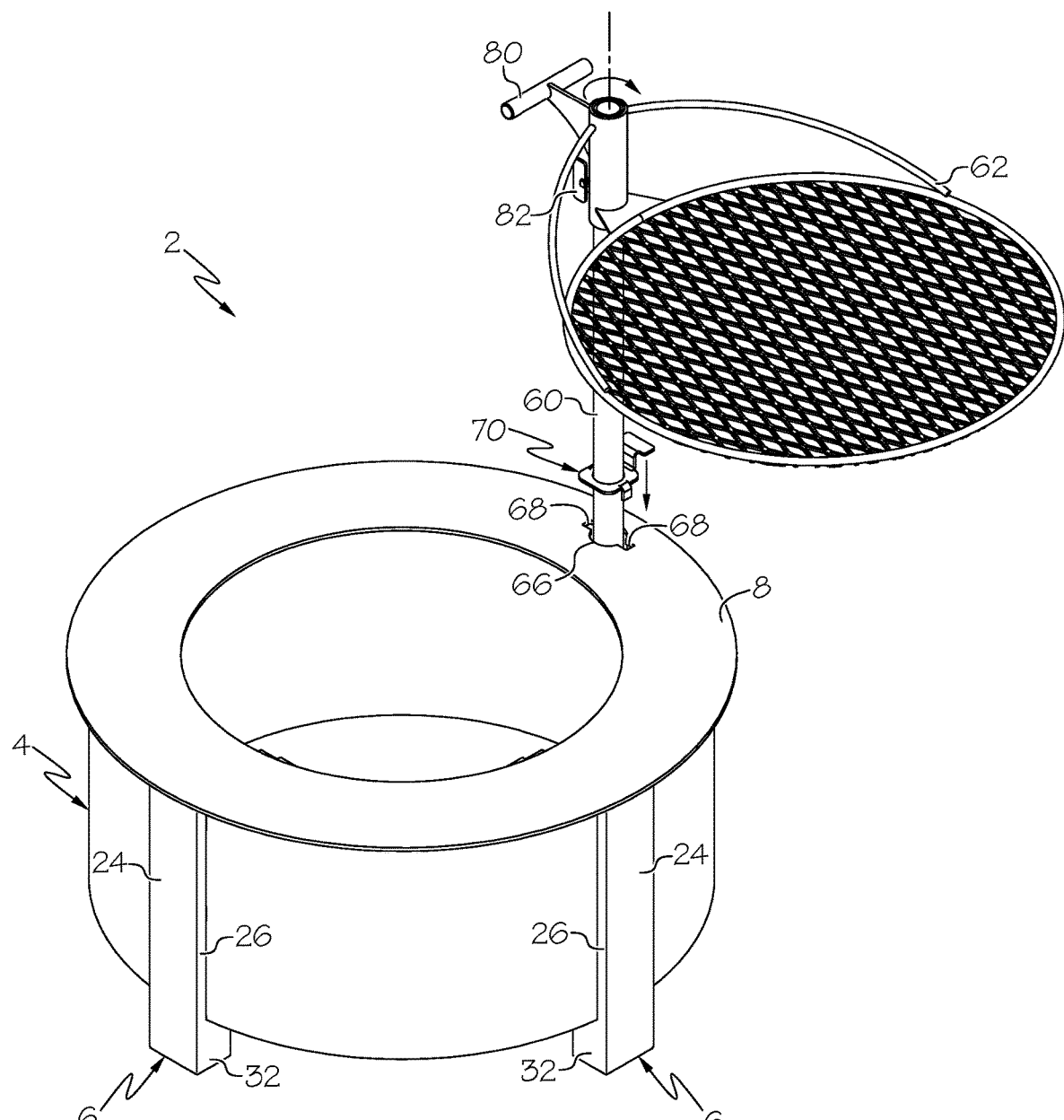
FIG. 5 depicts another step of installing the support post.
Figure 6:
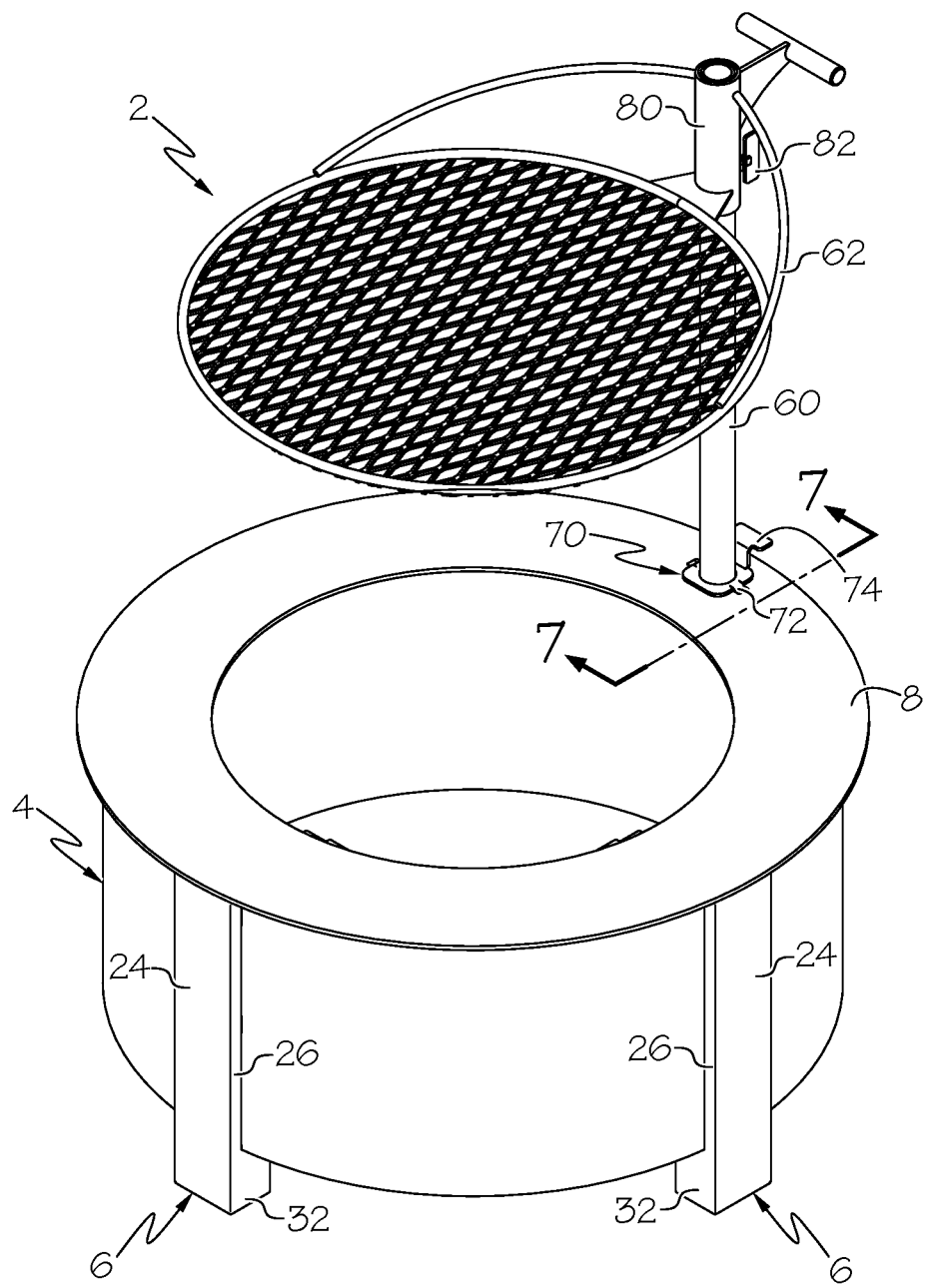
FIG. 6 depicts another step of installing the support post.

In this configuration, locking projections 64 are provided by a pin or dowel disposed through post 60. Locking projections 64 also can be formed by welding tabs to the exterior of post 60. The top of sleeve 63 is spaced down far enough from the lower surface of flange 8 to provide room for locking projections 64 to ride on the upper end of sleeve 63. Flange 8 defines a post opening 66 that includes open ears 68 sized to allow locking projections 64 to pass through flange 8. The user inserts post 60 into opening 66 with locking projections 64 aligned with ears 68 as shown in FIG. 4. Post 60 is moved downwardly until locking projections 64 engage the top of sleeve 63. The user then rotates post 60 one direction or the other as shown in FIG. 5 until one or both of locking projections 64 engages sidewalls 16 and 18. A lock collar 70 is slidably carried on post 60 above locking projections 64. Lock collar 70 has two locking fingers 72 that project down along post 60. When locking projections 64 are under flange 8 and rotated into engagement with sidewalls 16 and 18, lock collar 70 is slid down onto flange 8 to position locking fingers 72 through open ears 68 in alignment with locking projections 64 to prevent post 60 from rotating back to a position where locking projections 64 are aligned with ears 68. Lock collar 70 includes a handle 74 that projects rearwardly behind post 60 to keep it cooler so post 60 can be unlocked and removed after cooking.

Grill 62 includes its own handle 80 and locking screw 82 that allows it to be selectively locked and rotated with respect to post 60.

In some situations, the owner of accessory post 60 and cooking grill 62 desire to use these with a camp fire that is not built inside device 2. For example, the owner may be camping at a remote location where it is inconvenient to bring along device 2. The disclosure provides an exemplary post holder 102 that secures accessory post 60 in the ground 104 next to a camp fire location 106 so that cooking grill 62 and/or a kettle hook 108 can be used to prepare food. Driving accessory post 60 directly into ground 104 can yield a wobbly arrangement especially when relatively heavy items are placed on cooking grill 62 which is cantilevered over the fire.

Post holder 102 generally includes a hollow main tube 110 with a pointed lower end 112 that allows it to be driven into ground 104. Main tube 110 is sized to slidingly receive accessory post 60. Pointed lower end 112 is closed to prevent dirt from filling main tube 110 when post holder is driven into ground 104. Post holder 102 also includes at least one stabilizing arm 114 projecting away from the upper portion of main tube 110. One to four arms 114 can be used. Two stabilizing arms 114 are depicted in the exemplary configuration. Each stabilizing arm 114 engages ground 104 when post holder 102 is fully driven into ground 104. Stabilizing arms 114 can include downwardly projecting anchors 116 that help stabilizing arms 114 be driven into ground 104. Anchors 116 can be located at the outer ends of arms 114.

Post holder 102 includes a pair of locking flanges 120 that each define an L-shaped locking slot 122 sized to receive one of locking projections 64 that project from accessory post 60. Locking slots 122 project in opposite directions and are aligned with the top of main tube 110 such that locking projections engage the top of main tube 110 and the bottom of locking slots 122 when accessory post 60 is fully inserted into post holder 102. Each flange 120 can define a recess open to the bottom of slot 122 sized to receive the end of a locking finger 72 such that each locking finger 72 will be disposed below locking projection 64 when lock collar 70 is fully seated. When accessory post 60 is fully inserted into post holder 102, locking projections 64 are disposed in locking slots 122 and are held at the ends of slots 122 by locking fingers 72 of lock collar 70 which is carried by accessory post 60. An optional stop 130 can be provided on accessory post 60 to limit the movement of lock collar 70.

Figure 11:
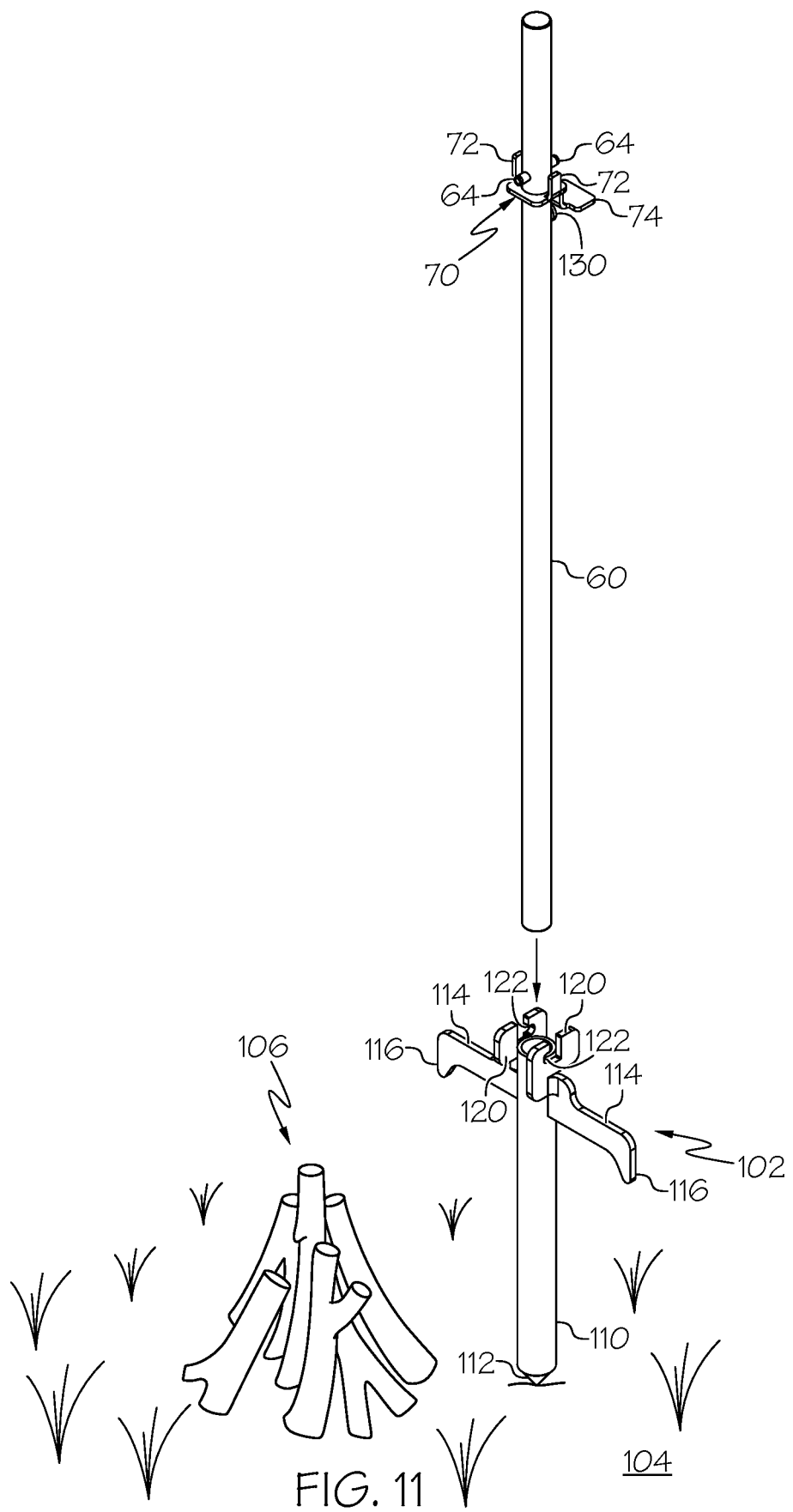
FIG. 11 is a perspective view of an exemplary post holder being installed next to a camp fire location.
Figure 12:
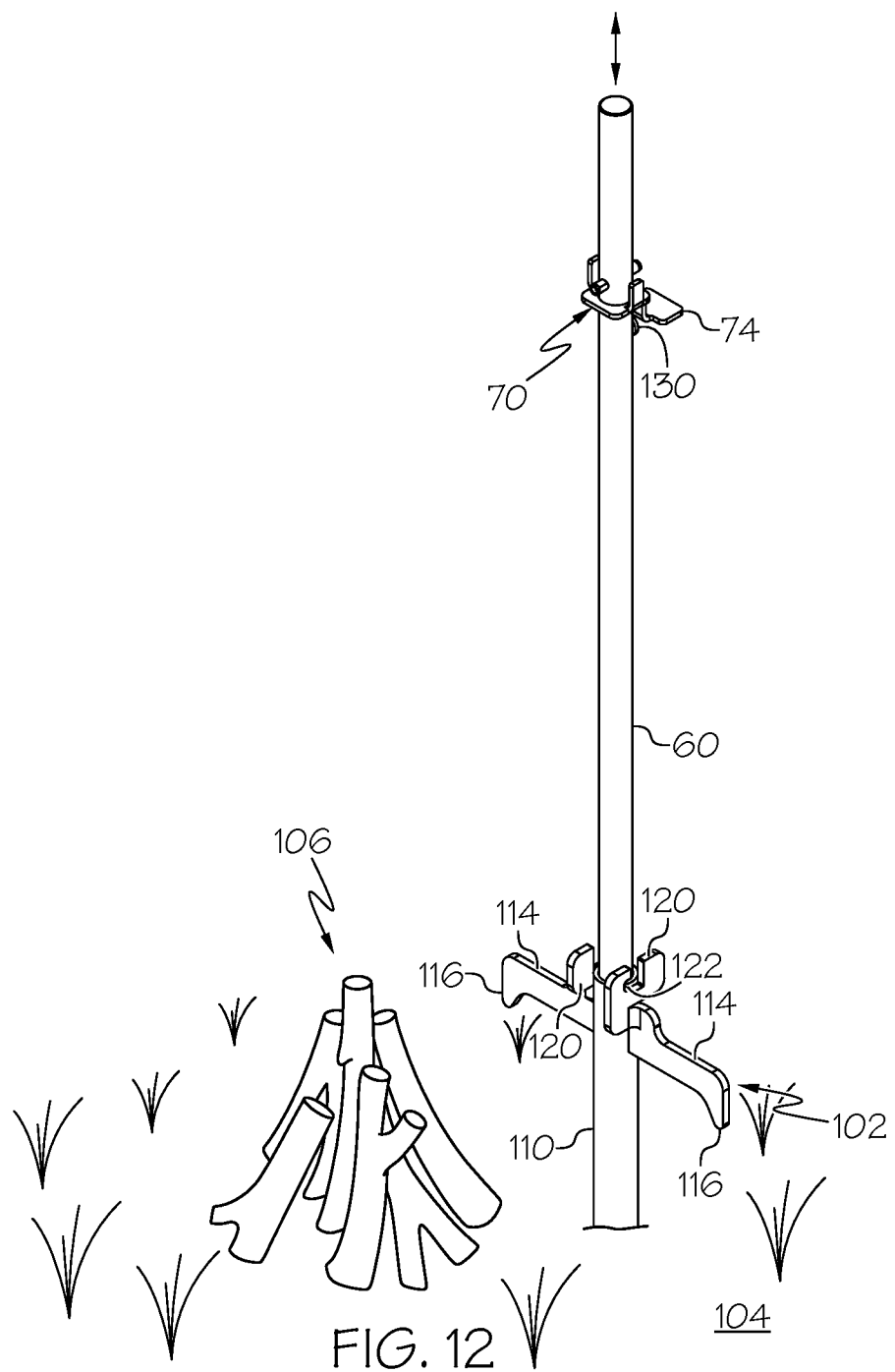
FIG. 12 depicts the post holder being driven into the ground by the accessory post.
Figure 13:
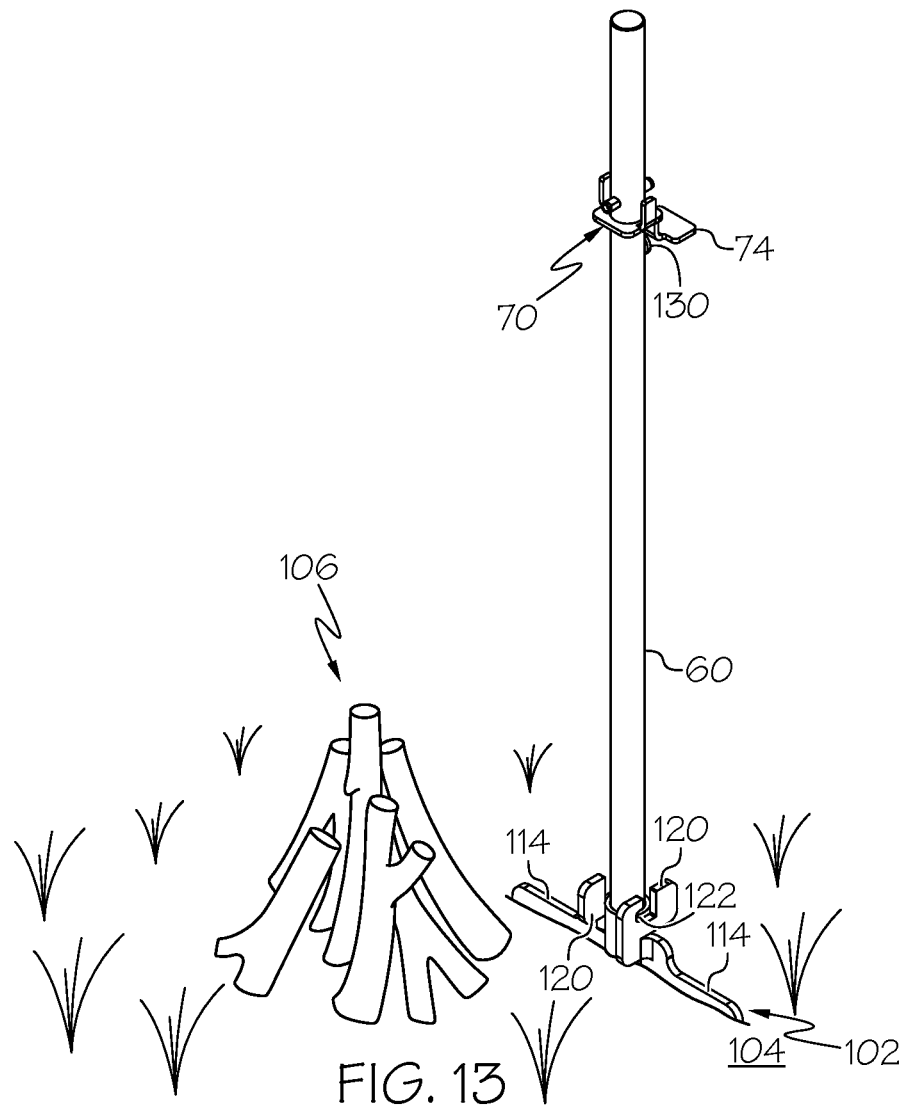
FIG. 13 depicts the post holder driven into the ground.
Figure 14:
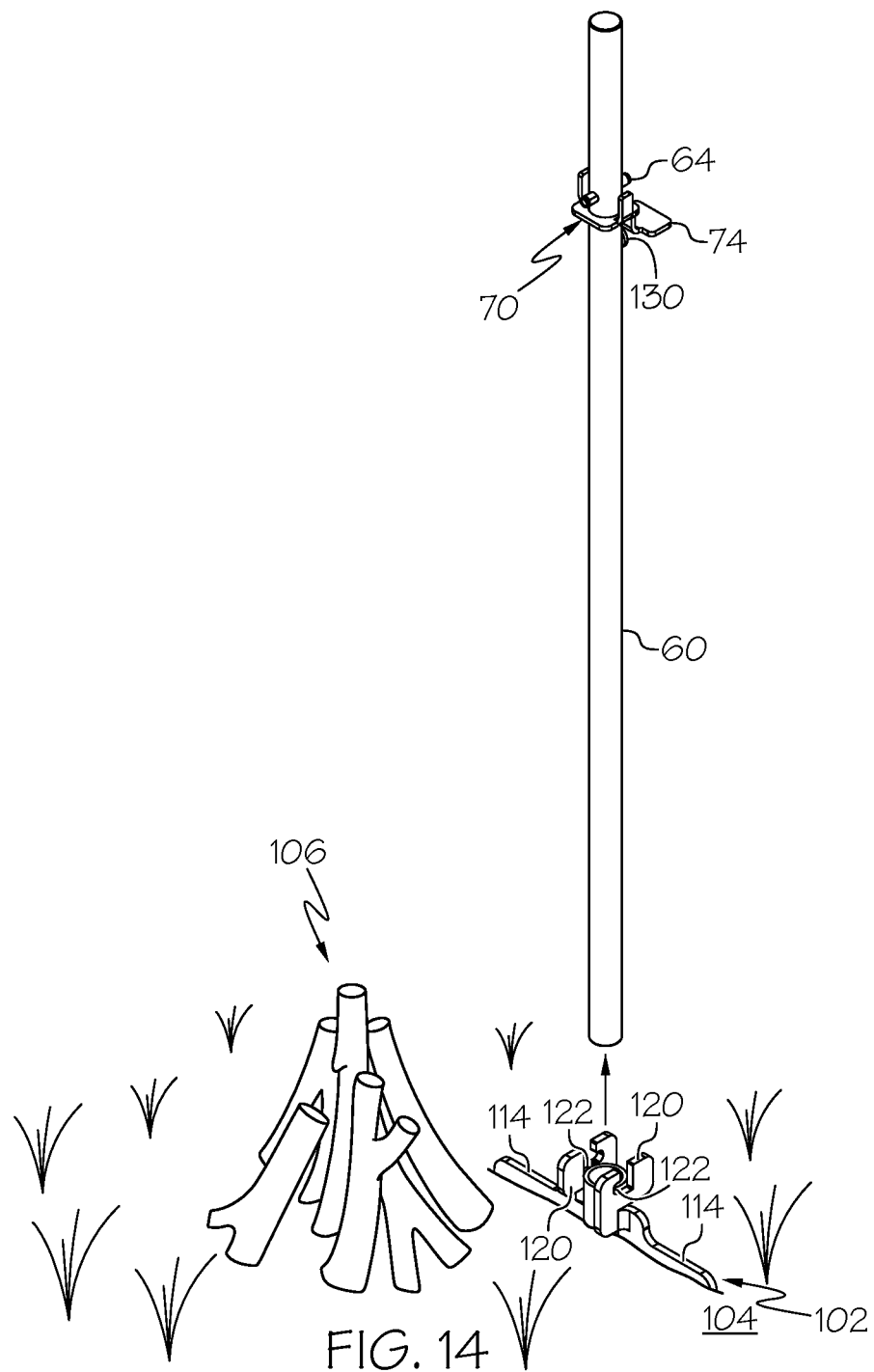
FIG. 14 depicts the removal of the accessory post.
Figure 15:
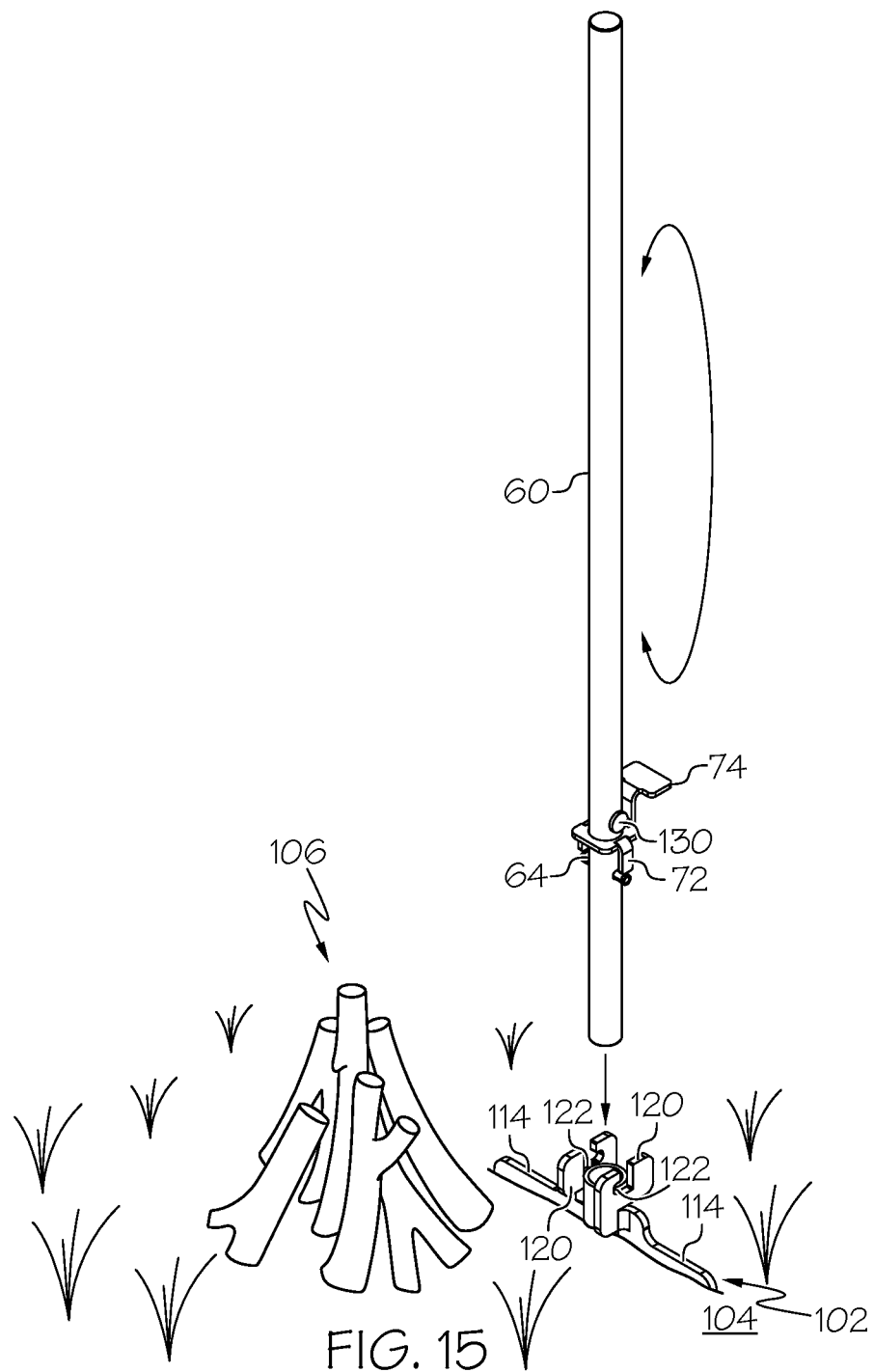
FIG. 15 depicts the rotation of the accessory post.
Figure 16:
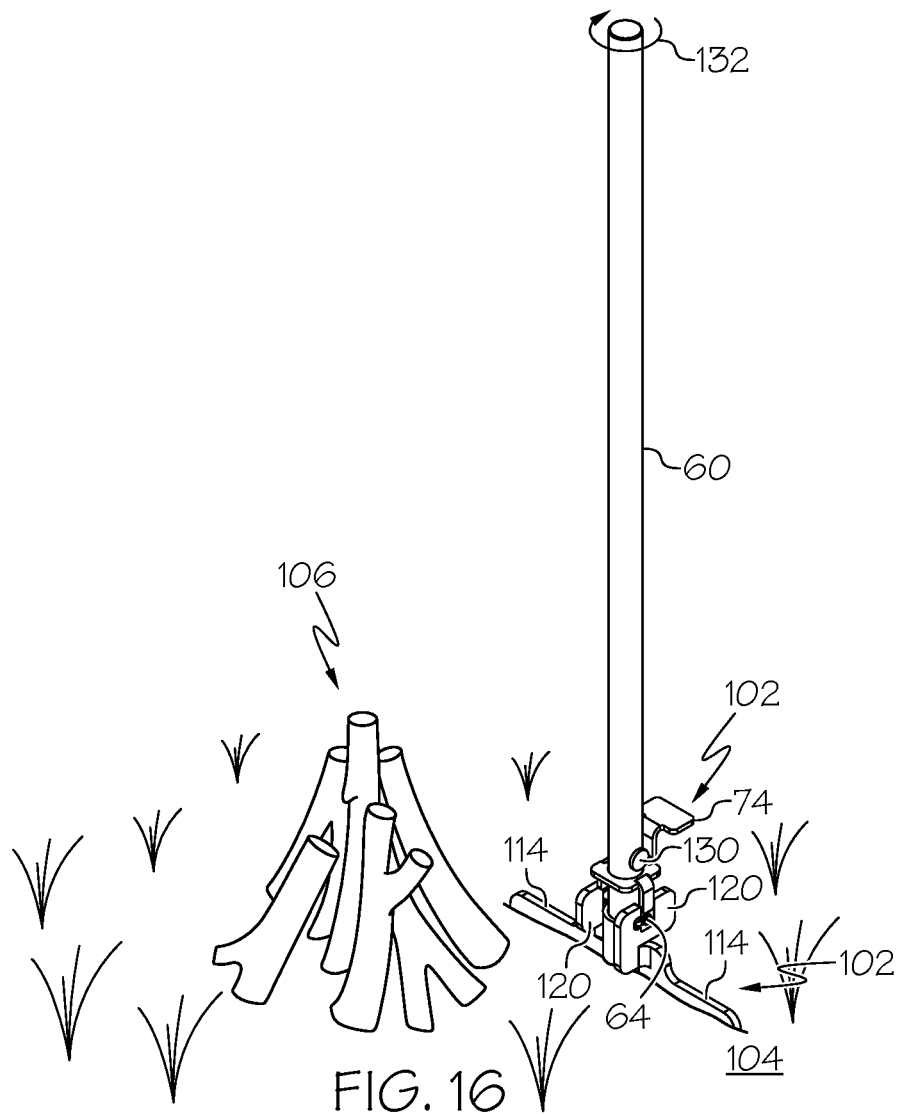
FIG. 16 depicts the insertion of the accessory post into the holder to a location where the locking projections engage the locking flanges of the post holder to stop the insertion of the accessory post.
Figure 17:
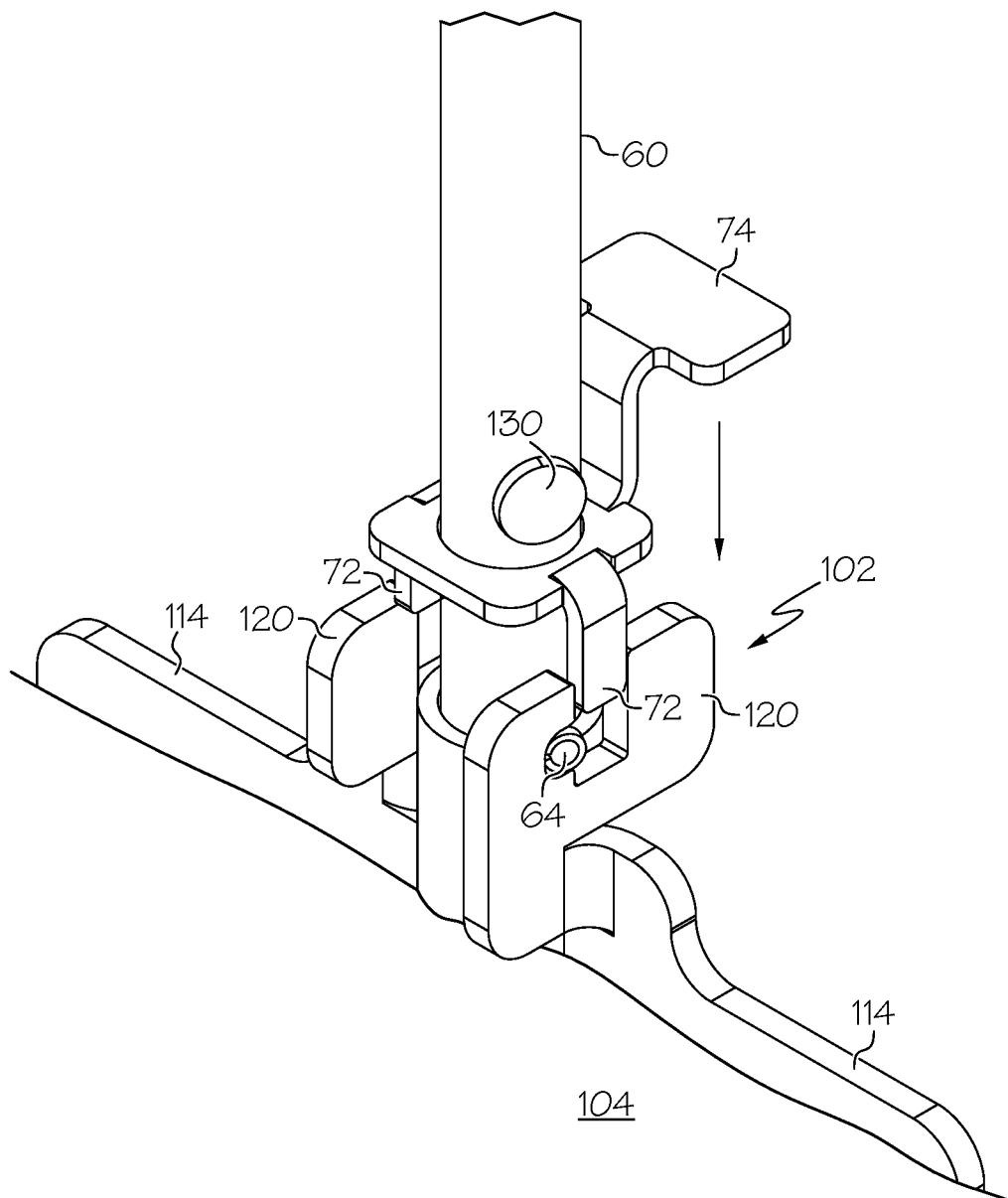
FIG. 17 depicts the rotated condition of the accessory post to place the locking projections in the locking slots and the installation of the lock collar.
Figure 18:
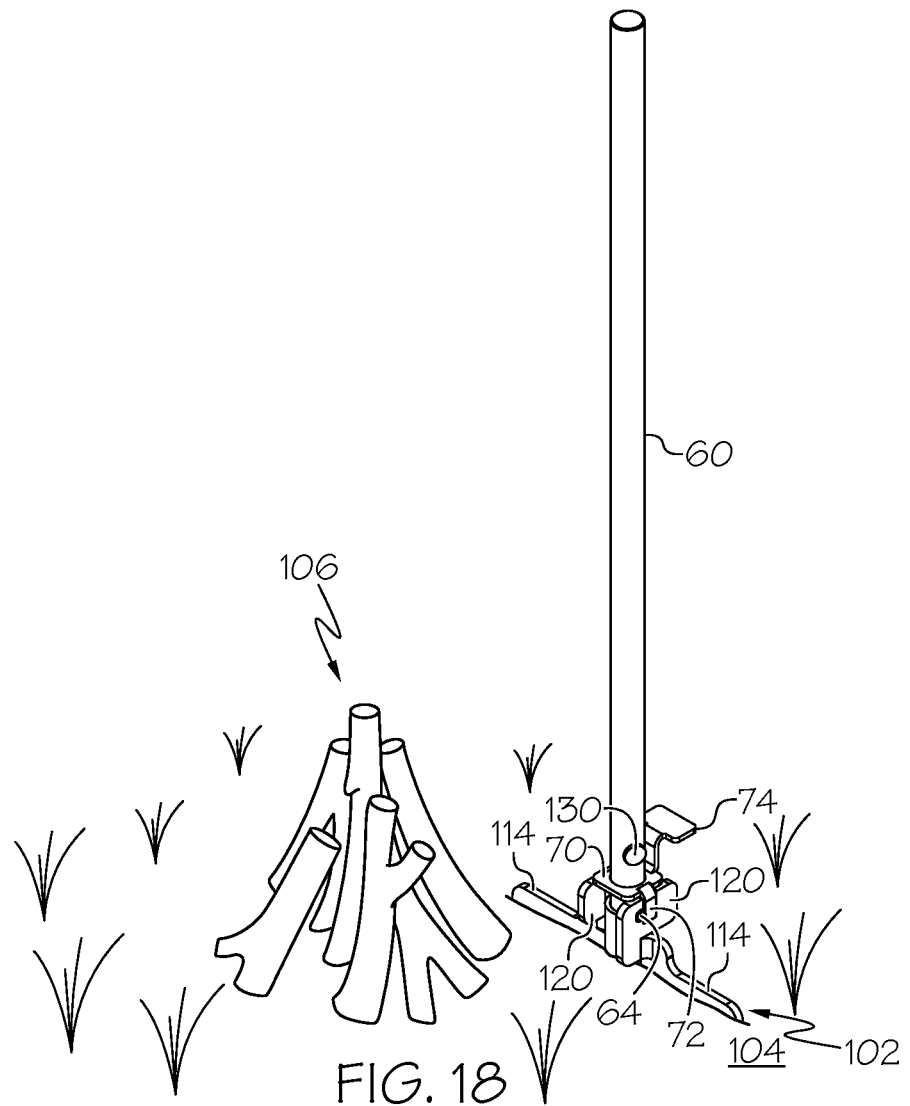
FIG. 18 depicts the lock collar installed with the lock fingers blocking movement of the locking projections.
Figure 19:
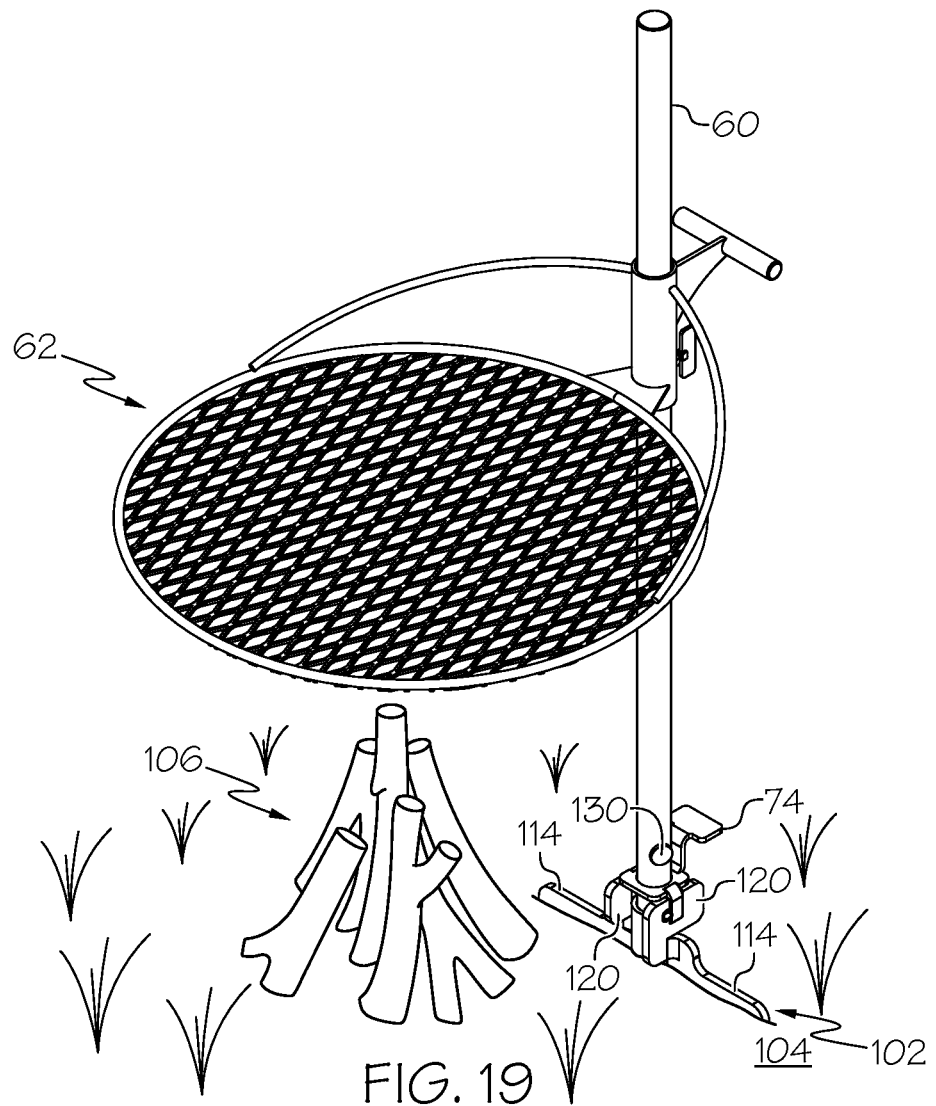
FIG. 19 depicts the use of a cooking grill with the accessory post secured by the post holder.
Figure 20:
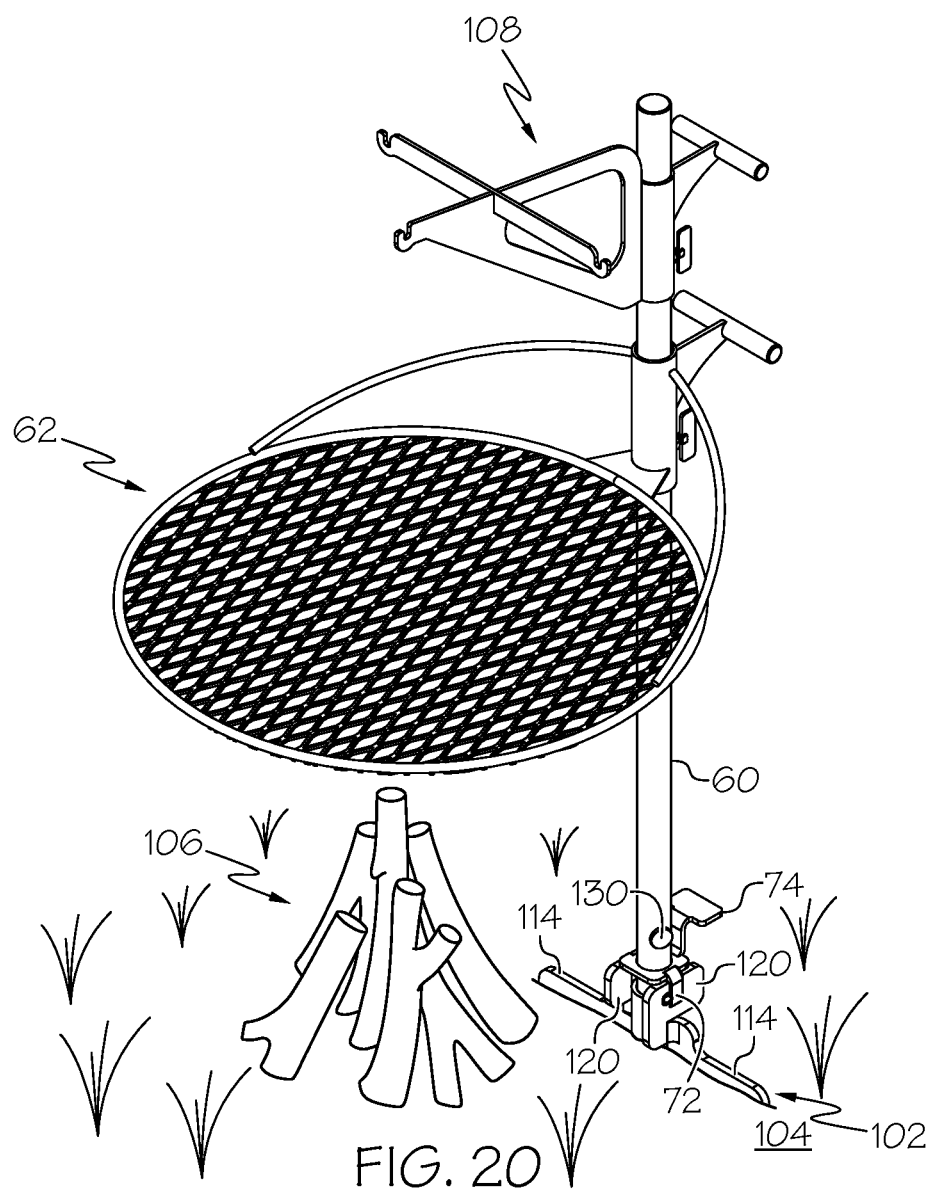
FIG. 20 depicts the addition of a kettle hook above the cooking grill.

Post holder 102 is used by driving it into ground 104 at a location next to the fire over which grill 62 will be used. Post holder 102 is configured to be driven into ground 104 by accessory post 60. First, the user locates post holder 102 and pushes it into ground 104 as far as it can be pushed into ground 104 by hand. The user then turns accessory post 60 upside down as shown in FIG. 11. The user then repeatedly drives accessory post 60 down inside main tube 110 until it engages the closed end of post holder 102 as shown in FIG. 12. The user continues to slide accessory post up and down striking the bottom of main tube 110 to drive post holder 102 into ground 104 until stabilizing arms 114 are driven into ground 104 as shown in FIG. 13. Accessory post 60 is then removed and turned over as shown in FIGS. 14 and 15. The user then slides accessory post 60 down into main tube 110 with locking projection 64 aligned with slots 122 until locking projections 64 engage locking flanges 120 or the top of main tube 110. The user then rotates accessory post 60 as shown by reference arrow 132 in FIG. 16 to position locking projections 64 at the ends of locking slots 122. The user then moves lock collar 70 down until locking fingers 72 slide into the vertical portions of locking slots 122 to block movement of locking projections 64 as shown in FIGS. 17 and 18. The user then connects grill 62 and kettle hook 108 to accessory post 60 where they are ready to use for cooking.

Figure 21:
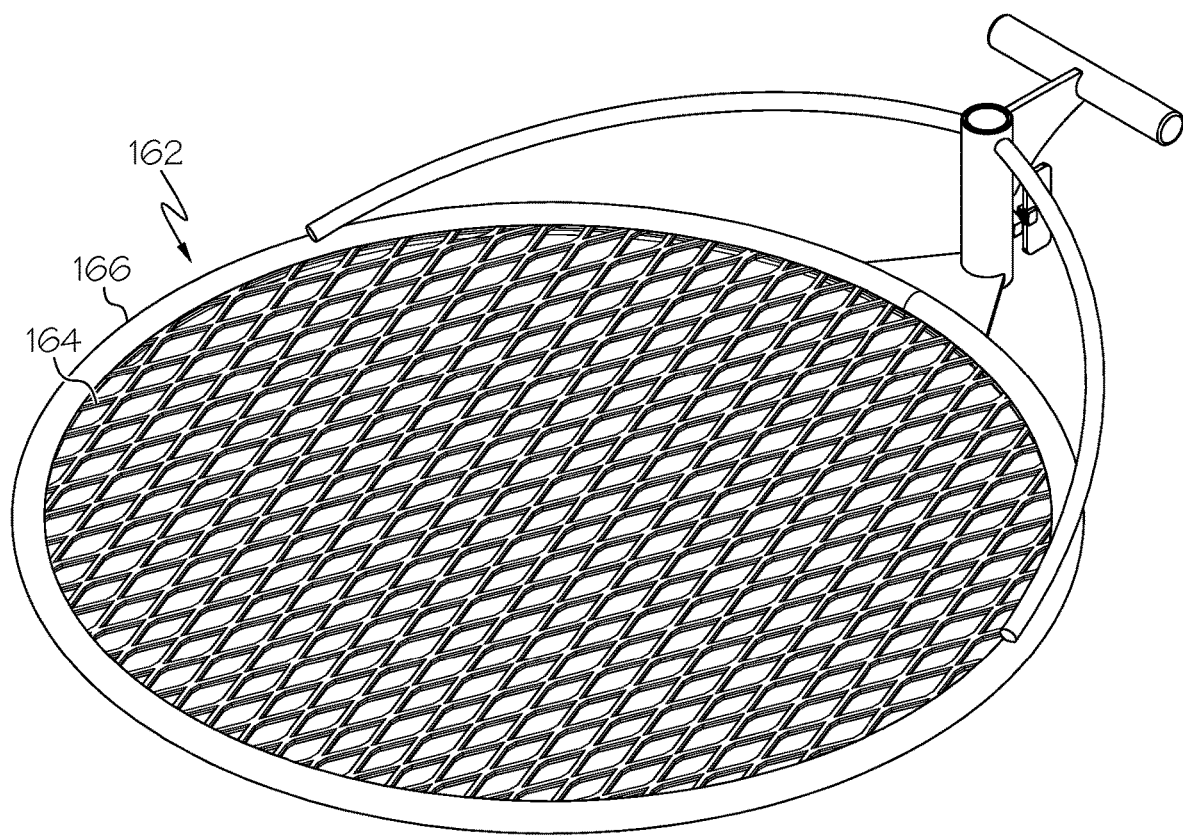
FIG. 21 is a perspective view of an alternative configuration for a cooking grill.
Figure 22:
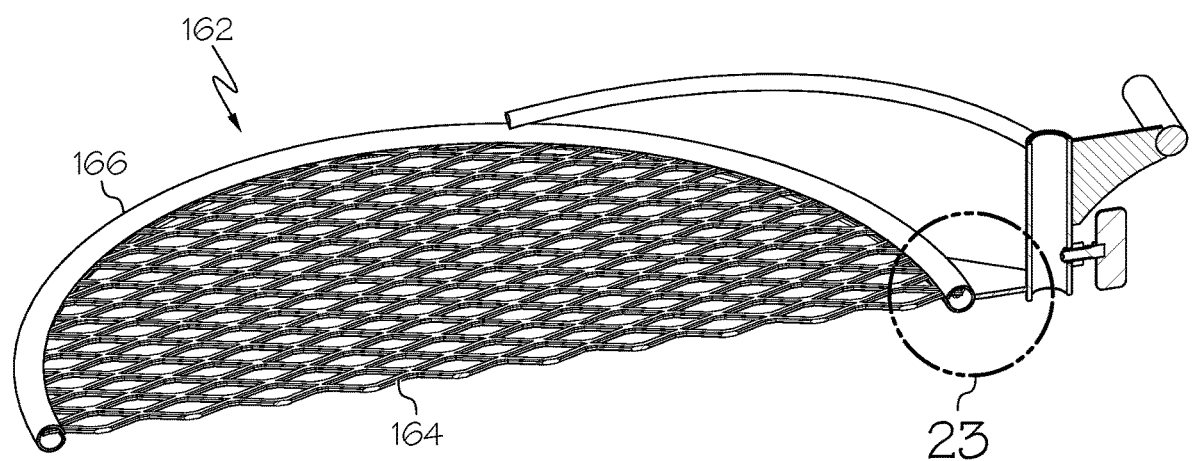
FIG. 22 is a section view taken through the grill of FIG. 21.
Figure 23:
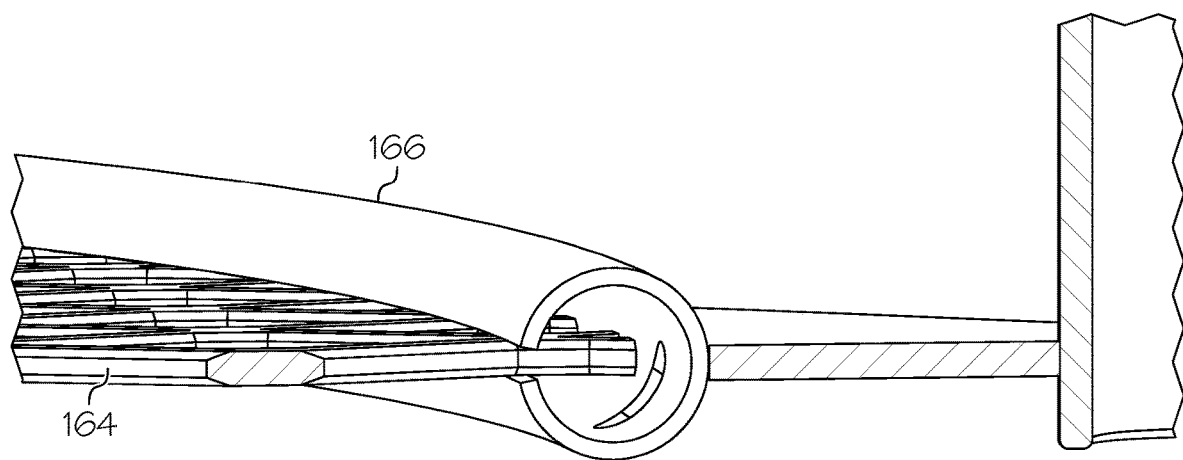
FIG. 23 is an enlarged section view of the encircled portion of FIG. 22.

An alternative configuration for a cooking grill is depicted in FIGS. 21-23 and indicated by the reference number 162. Grill 162 includes a grilling grate 164 that defines a plurality of openings. Grilling grate 164 can be formed in a variety of ways such as a welded grid of bars but many of these grilling grates are formed from sections of expanded metal. The round sections of expanded metal are cut from larger pieces which leaves a plurality of sharp metal ends about the perimeter. Although these metal ends can be ground smooth and disposed under a rim as depicted in FIG. 9, the user still contacts these ends when grill 62 is lifted by grasping its perimeter. Cooking grill 162 eliminates the need to grind the metal ends down to smooth ends. Cooking grill 162 provides an outer body member 166 that surrounds the outer perimeter edge of grilling grate 164 and prevents the users from contacting the outer perimeter edge of grilling grate 164 from both above and below. The protection can be understood by viewing FIG. 23. When one lifts grill 162 by grasping outer body member 166 with the user's hands, the hands cannot contact the sharp metal ends disposed inside outer body member 166. Outer body member 166 projects above the upper surface of grilling grate 164 to provide a retention lip to grate 164 to help retain items on grate 164.

In addition to protecting the user from the sharp metal ends of grilling grate 164, outer body member 166 also strengthens grill 162 and helps grill 162 resist bending forces. In the exemplary configuration, outer body member 166 is ⅝ inch outer diameter round pipe provided by metal formed for a pipe but without the seam welded. This is bent into the circular shape and fitted around the outer perimeter of grilling grate 164 and then welded closed and welded to grate 164. Other sizes from ⅜ inch to 1½ inch can also be used. Other cross sectional shapes also can be used. Outer body member 166 supports the outer perimeter edge of grate 164 from below and stiffens grate 164.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the above description and attached illustrations are an example and the invention is not limited to the exact details shown or described. Throughout the description and claims of this specification the words "comprise" and "include" as well as variations of those words, such as "comprises," "includes," "comprising," and "including" are not intended to exclude additives, components, integers, or steps.

The invention claimed is:

1. A fire pit comprising:
a body having a bottom wall and a sidewall that define a fire box; the fire box adapted to receive items to be burned when the fire pit is used;
the bottom wall defining an air opening;
an elongated air inlet arm connected to the bottom wall; the air inlet arm being hollow and disposed over the air opening;
the air inlet arm having first and second ends; the air inlet arm having a top portion that defines a plurality of spaced-apart, discrete air inlets for the fire box along the air inlet arm between the first and second ends; the air inlets being spaced apart by portions of the air inlet arm; and
each of the spaced-apart, discrete air inlets being spaced above the bottom wall by a portion of the air inlet arm.

2. The fire pit of claim 1, wherein the air inlet arm includes an overhang disposed above each air inlet defined by the top portion of the air inlet arm.

3. The fire pit of claim 1, wherein at least one of the first and second ends of the air inlet arm is open.

4. The fire pit of claim 1, further comprising a plurality of legs adapted to support the bottom wall above a support surface when the fire pit is placed on the support surface.

5. The fire pit of claim 1, further comprising an air duct positioned along the sidewall to deliver heated air to the fire box; the air duct having an air supply opening located a distance above the bottom wall of the fire box.

6. The fire pit of claim 5, further comprising a flange at a top of the sidewall; the flange having a portion that overhangs the fire box.

7. The fire pit of claim 5, further comprising an accessory post having an upper portion and a lower portion; the lower portion of the accessory post being located in the air duct when the accessory post is connected to the fire pit.

8. The fire pit of claim 1, wherein the air inlet arm has first and second sides; the top portion of the air inlet arm defining air inlets for the fire box on both of the first and second sides of the air inlet arm.

9. The fire pit of claim 1, wherein the air inlet arm includes an overhang disposed above each air inlet; the overhangs being spaced-apart.

10. A fire pit comprising:
a body having a bottom wall and a sidewall that define a fire box; the fire box adapted to receive items to be burned when the fire pit is used;
the bottom wall defining an air opening;
an elongated air inlet arm connected to the bottom wall; the air inlet arm being hollow and disposed over the air opening;
the air inlet arm having first and second ends; the air inlet arm having a top portion that defines air inlets for the fire box along the air inlet arm between the first and second ends;
the air inlets being spaced above the bottom wall;
wherein the air inlet arm has first and second sides; the top portion of the air inlet arm defining air inlets for the fire box on both of the first and second sides of the air inlet arm; and
wherein the width of the air inlet arm is defined between the first and second sides; and the second end of the air inlet arm defining an outer perimeter air inlet spaced from the sidewall by a distance that is less a width of the air inlet arm.

11. A fire pit comprising:
a body having a bottom wall and a sidewall that define a fire box; the fire box adapted to receive items to be burned when the fire pit is used;
the bottom wall defining a plurality of air openings;
a plurality of hollow air inlet arms connected to the bottom wall over the air openings;
each of the air inlet arms having first and second ends;
each of the air inlet arms having a top portion that defines spaced-apart, discrete air inlets for the fire box along the air inlet arm between the first and second ends; and
the spaced-apart, discrete air inlets being spaced above the bottom wall.

12. The fire pit of claim 11, wherein each of the air inlet arms include overhangs disposed above the air inlets.

13. The fire pit of claim 11, wherein each of the air inlet arms has at least one open first and second end.

14. The fire pit of claim 11, further comprising a plurality of legs adapted to support the bottom wall above a support surface when the fire pit is placed on the support surface.

15. The fire pit of claim 11, further comprising an air duct positioned along the sidewall to deliver heated air to the fire box; the air duct having an air supply opening located a distance above the bottom wall of the fire box.

16. The fire pit of claim 15, further comprising a flange at a top of the sidewall; the flange having a portion that overhangs the fire box.

17. The fire pit of claim 15, further comprising an accessory post having an upper portion and a lower portion; the lower portion of the accessory post being located in the air duct when the accessory post is connected to the fire pit.

18. The fire pit of claim 11, wherein each of the air inlet arms has first and second sides; the top portion of each of the air inlet arms defining air inlets for the fire box on both of the first and second sides of the air inlet arm.

19. The fire pit of claim 11, wherein each of the air inlet arms includes an overhang disposed above each air inlet; the overhangs being spaced-apart.

20. The fire pit of claim 11, wherein the air inlet arms are arranged to extend radially outwardly from a central point of the bottom wall.

21. The fire pit of claim 20, wherein the first ends of the air inlet arms are open and directly connected to one another.

22. A fire pit comprising:
a body having a bottom wall and a sidewall that define a fire box; the fire box adapted to receive items to be burned when the fire pit is used;
the bottom wall defining a plurality of air openings;
a plurality of legs adapted to support the bottom wall above a support surface when the fire pit is placed on the support surface;
a plurality of hollow air inlet arms connected to the bottom wall over the air openings;
each of the air inlet arms having a top wall and first and second sides; portions of each of the first and second sides extending entirely between the top wall of the air inlet arm and the bottom wall of the body;
a top portion of each of the air inlet arms defining spaced-apart, discrete air inlets for the fire box on both the first and second sides of the air inlet arm;
each of the air inlets being spaced above the bottom wall with a portion of a side of the air inlet arm disposed between the air inlet and the bottom wall; and
each of the air inlet arms including overhangs disposed above the air inlets.

23. The fire pit of claim 22, further comprising an air duct positioned along the sidewall to deliver heated air to the fire box; the air duct having an air supply opening located a distance above the bottom wall of the fire box.

24. The fire pit of claim 23, further comprising a flange at a top of the sidewall; the flange having a portion that overhangs the fire box.

25. The fire pit of claim 23, further comprising an accessory post having an upper portion and a lower portion; the lower portion of the accessory post being located in the air duct when the accessory post is connected to the fire pit.

26. The fire pit of claim 22, wherein each air inlet arm has an inner end and an outer end; the inner ends of the air inlet arms being connected.

27. A fire pit comprising:
a body having a bottom wall and a sidewall that define a fire box; the fire box adapted to receive items to be burned when the fire pit is used;
the bottom wall defining an air opening;
an elongated air inlet arm connected to the bottom wall; the air inlet arm being hollow and disposed over the air opening;
the air inlet arm having first and second sides; a top portion of the air inlet arm defining spaced-apart, discrete air inlets for the fire box on both of the first and second sides of the air inlet arm;
the air inlet arm having an overhang for each of the air inlets; the overhangs being spaced apart; and
each of the air inlets being spaced above the bottom wall by a portion of one of the first and second sides.

28. The fire pit of claim 27, wherein the air inlet arm includes a top wall; each side of the air inlet arm having a portion that extends entirely from the top wall of the air inlet arm to the bottom wall of the fire box body between air inlets.

29. The fire pit of claim 27, further comprising an air duct positioned along the sidewall to deliver heated air to the fire box.

30. The fire pit of claim 29, further comprising a flange at a top of the sidewall; the flange having a portion that overhangs the fire box.

31. The fire pit of claim 29, further comprising an accessory post having an upper portion and a lower portion; the lower portion of the accessory post being located in the air duct when the accessory post is connected to the fire pit.

\* \* \* \* \*